US009979606B2

United States Patent
Gupta et al.

(10) Patent No.: US 9,979,606 B2
(45) Date of Patent: May 22, 2018

(54) BEHAVIORAL ANALYSIS TO AUTOMATE DIRECT AND INDIRECT LOCAL MONITORING OF INTERNET OF THINGS DEVICE HEALTH

(71) Applicant: QUALCOMM Incorporated, San Diego, CA (US)

(72) Inventors: Rajarshi Gupta, Sunnyvale, CA (US); Mastooreh Salajegheh, San Jose, CA (US); Mihai Christodorescu, San Jose, CA (US); Vinay Sridhara, Santa Clara, CA (US); Govindarajan Krishnamurthi, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 359 days.

(21) Appl. No.: 14/638,602

(22) Filed: Mar. 4, 2015

(65) Prior Publication Data
US 2016/0261465 A1 Sep. 8, 2016

(51) Int. Cl.
*G06F 15/173* (2006.01)
*H04L 12/24* (2006.01)
(Continued)

(52) U.S. Cl.
CPC .......... *H04L 41/14* (2013.01); *H04L 12/2816* (2013.01); *H04L 41/145* (2013.01);
(Continued)

(58) Field of Classification Search
None
See application file for complete search history.

(56) References Cited

U.S. PATENT DOCUMENTS 8,280,009 B2 10/2012 Stepanian
8,473,325 B2 6/2013 Barnhill, Jr. et al.
(Continued)

FOREIGN PATENT DOCUMENTS

WO 2010131259 A2 11/2010
WO 2015157108 10/2015

OTHER PUBLICATIONS

Atis ONEM2M, "Functional Architecture", TS-0001-V1.6.1, ONEM2M Technical Specification, 2015, 321 pages.
(Continued)

*Primary Examiner* — Brian Whipple
(74) *Attorney, Agent, or Firm* — Muncy, Geissler, Olds & Lowe, P.C.

(57) ABSTRACT

The disclosure generally relates to behavioral analysis to automate monitoring Internet of Things (IoT) device health in a direct and/or indirect manner. In particular, normal behavior associated with an IoT device in a local IoT network may be modeled such that behaviors observed at the IoT device may be compared to the modeled normal behavior to determine whether the behaviors observed at the IoT device are normal or anomalous. Accordingly, in a distributed IoT environment, more powerful "analyzer" devices can collect behaviors locally observed at other (e.g., simpler) "observer" devices and conduct behavioral analysis across the distributed IoT environment to detect anomalies potentially indicating malicious attacks, malfunctions, or other issues that require customer service and/or further attention. Furthermore, devices with sufficient capabilities may conduct (local) on-device behavioral analysis to detect anomalous conditions without sending locally observed behaviors to another aggregator device and/or analyzer device.

30 Claims, 23 Drawing Sheets

(51) Int. Cl.
  *H04L 12/26* (2006.01)
  *H04L 12/28* (2006.01)
(52) U.S. Cl.
  CPC .......... *H04L 43/08* (2013.01); *H04L 41/0654* (2013.01); *H04L 41/12* (2013.01); *H04L 41/5061* (2013.01)

(56) References Cited

U.S. PATENT DOCUMENTS

| | | | |
|---|---|---|---|
| 8,856,289 | B2 | 10/2014 | Ansari et al. |
| 2004/0103144 | A1 | 5/2004 | Sallam et al. |
| 2008/0136581 | A1 | 6/2008 | Heilman et al. |
| 2009/0199296 | A1 | 8/2009 | Xie et al. |
| 2009/0281676 | A1 | 11/2009 | Beavis et al. |
| 2011/0029658 | A1 | 2/2011 | Werth et al. |
| 2013/0227114 | A1 | 8/2013 | Vasseur et al. |
| 2014/0047544 | A1 | 2/2014 | Jakobsson |
| 2014/0053261 | A1 | 2/2014 | Gupta et al. |
| 2014/0244001 | A1 | 8/2014 | Glickfield et al. |
| 2014/0244768 | A1 | 8/2014 | Shuman et al. |
| 2015/0163121 | A1* | 6/2015 | Mahaffey ............ G06F 11/0766 707/687 |
| 2016/0212099 | A1* | 7/2016 | Zou ..................... H04L 63/0263 |
| 2016/0218949 | A1* | 7/2016 | Dasgupta ............ H04L 63/1416 |
| 2016/0218951 | A1* | 7/2016 | Vasseur .................. H04L 43/12 |
| 2016/0219065 | A1* | 7/2016 | Dasgupta ............ H04L 63/1441 |
| 2016/0219066 | A1* | 7/2016 | Vasseur ............... H04L 63/1458 |
| 2016/0219070 | A1* | 7/2016 | Vasseur ................. H04L 45/306 |
| 2016/0219071 | A1* | 7/2016 | Vasseur ............... H04L 63/1425 |
| 2016/0247164 | A1 | 8/2016 | Salajegheh et al. |
| 2016/0261621 | A1* | 9/2016 | Srivastava .......... H04L 63/1425 |

OTHER PUBLICATIONS

Atis ONEM2M, "Service Layer Core Protocol Specification", TS-0004-V1.0.1, ONEM2M Technical Specification, 2015, 217 pages.
El-Zabadani H., et al., "The Gator Tech Smart House: A Programmable Pervasive Space," Computer, Mar. 1, 2005, vol. 38 (3), pp. 50-60, XP011129155, ISSN: 0018-9162, DOI: 10.1109/MC.2005.107 p. 52, left-hand column Section "Sensor Platform"; p. 55.
Patricio G., et al., "Smart House Monitoring and Actuating System Development using Automatic Code Generation," 7th IEEE International Conference on Industrial Informatics, Jun. 23, 2009, pp. 256-261, XP031504251, ISBN: 978-1-4244-3759-7, Section "Node Interaction"; p. 258.
Chekina L., et al., "Detection of deviations in mobile applications network behavior", arXiv:1208.0564v2, Aug. 5, 2012 (Aug. 5, 2012), 5 pages, XP055107301, Retrieved from the Internet: URL: http://arxiv.org/abs/1208.0564v2 [retrieved on Nov. 1, 2013] the whole document.
International Search Report and Written Opinion—PCT/US2016/020072—ISA/EPO—May 3, 2016.

* cited by examiner

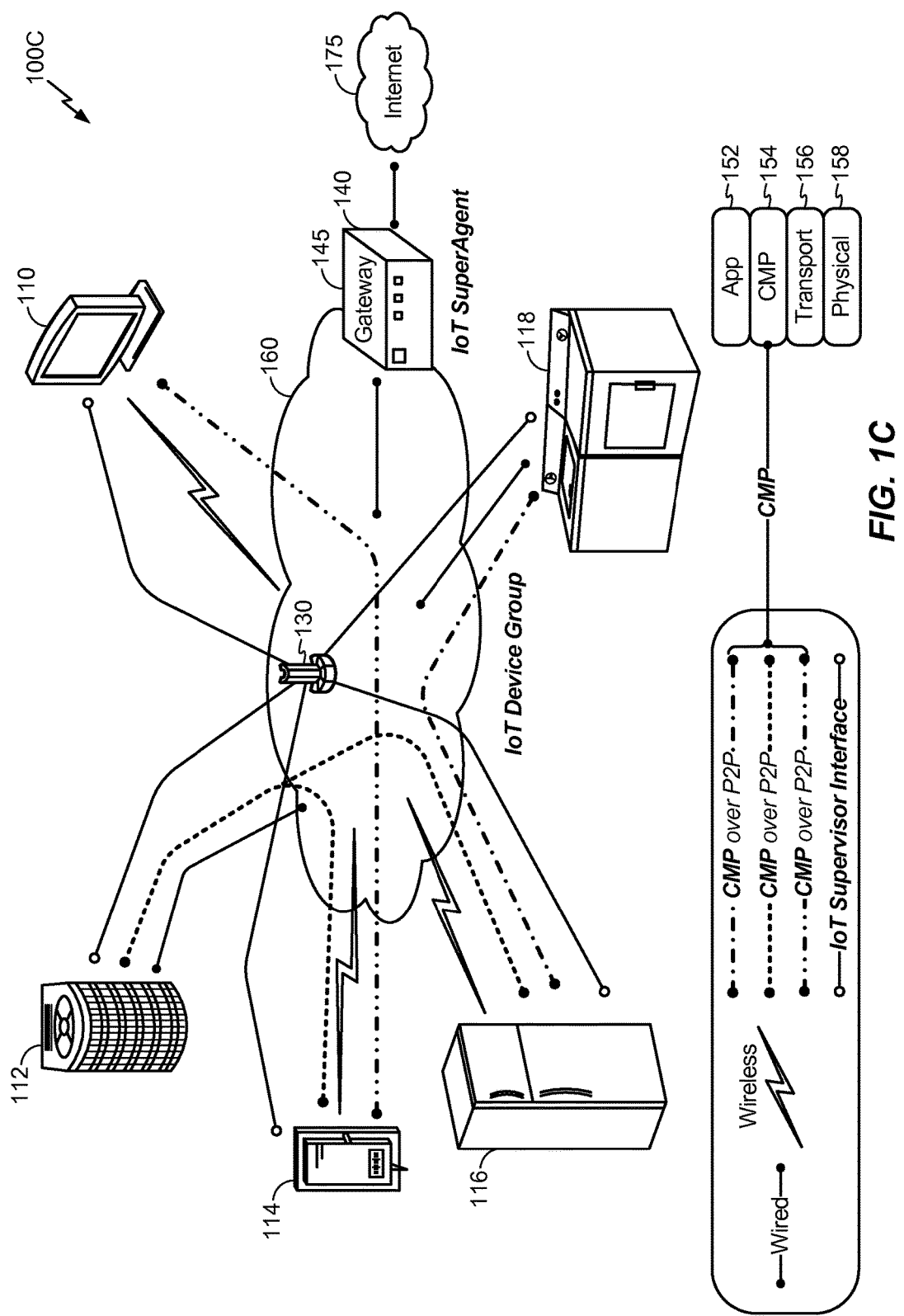

BEHAVIORAL ANALYSIS TO AUTOMATE DIRECT AND INDIRECT LOCAL MONITORING OF INTERNET OF THINGS DEVICE HEALTH

TECHNICAL FIELD

The various aspects and embodiments described herein broadly relate to the Internet of Things (IoT), and more particularly, to behavioral analysis to automate monitoring IoT device health in a direct and/or indirect manner.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

As such, with increasing development in IoT technologies, IoT devices are expected to proliferate in the near future, which will lead to numerous IoT devices surrounding users at home, in vehicles, at work, and many other locations. One concern in the IoT technology space involves making customer service for IoT devices automated, cheaper, easier, and faster for both manufacturers and customers. For example, figuring out the problem with a device and then having to find someone to service the problem or spend time talking to service personnel to explain and understand the problem is a burdensome, costly, and time-consuming process. Furthermore, although certain connected devices (e.g., computers) may support remote troubleshooting, many devices may not have capabilities to support remote login and logging, and understanding and fixing the system issue is not a trivial job even on connected devices with remote login capabilities. Another concern with the IoT is vulnerability to malicious attacks, due at least in part to the fact that many IoT devices are simple devices often built without security in mind (e.g., toasters, thermostats, laundry machines, televisions, light fixtures, and other everyday objects). At the same time, device simplicity implies relatively limited behaviors in which certain IoT devices can engage, which can provide opportunities with respect to both the customer service problem and the security problem because both involve behavior anomalies at least to a degree (e.g., sudden spikes in network traffic may indicate that a denial of service (DoS) attack against a computer, power drawn over a large time period may indicate a faulty appliance, etc.).

Accordingly, in smart connected homes and other connected IoT environments, most appliances and other IoT devices will be connected to each other and will likely have the capability to at least monitor behavior that occurs locally. Nonetheless, despite having the ability to observe certain behavioral features, many IoT devices can be expected to lack sufficient resources to conduct the behavior analysis necessary to detect and remediate anomalous behavior. Furthermore, in connected environments that have many IoT devices, certain anomalies indicating potential security breaches or malfunctions may only become apparent after considering the state of the environment as a whole, which can be difficult in environments with many simple IoT devices that have limited capabilities.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, the fact that IoT environments are expected to typically include various heterogeneous devices with different capabilities can be leveraged to conduct direct and indirect behavioral analysis to detect potentially malicious attacks against one or more devices in an IoT environment and to monitor device health and detect malfunctions or other anomalies such that customer service in IoT environments can be automated and made cheaper, easier, and faster from both a manufacturer perspective and a customer perspective. For example, many anomalies can be detected and analyzed based on some basic observations (e.g., power drawn over a particular time period, sensor measurements indicating local and/or ambient temperature, water levels, smoke levels, carbon dioxide and/or carbon monoxide levels, visibility levels, vibrations measured with an inertial measurement unit (IMU), etc.). Accordingly, considering the fact that many IoT devices are simple devices that have relatively limited behaviors (e.g., toasters, thermostats, laundry machines, televisions, light fixtures, and other everyday objects), most (if not all) devices in an IoT environment can be assumed to at least have the capability to observe certain local behaviors (e.g., power consumption, sensor outputs, etc.). Furthermore, even though all devices in a certain IoT environment may not have sufficient processing resources, storage resources, and/or other capabilities to conduct behavioral analysis, most (if not all) appliances and other devices in a smart connected IoT environment can be expected to have the capability to communicate over a network and therefore have the capability to send locally observed behaviors to more powerful devices. Accordingly, in an IoT environment having a distributed architecture, one or more devices in the IoT environment that are more powerful (e.g., a smartphone, an "always-on" wireless router, etc.) can aggregate behaviors that other (e.g., simpler) devices observe locally and/or conduct behavioral analysis across the distributed IoT environment in order to detect anomalies that may potentially indicate malicious attacks or malfunctions that require customer service. Furthermore, the more powerful devices in the IoT environment may conduct on-device (local) behavioral analysis to detect anomalous conditions without having to send locally observed behaviors to another aggregator and/or analyzer device.

For example, according to various aspects, a method for monitoring Internet of Things (IoT) device health may comprise modeling normal behavior associated with an IoT device in a local IoT network, analyzing behavioral information observed at the IoT device, and comparing the analyzed behavioral information to the modeled normal behavior associated with the IoT device to determine whether the behavioral information observed at the IoT device indicates normal behavior or anomalous behavior. In various embodiments, analyzing the behavioral information observed at the IoT device may comprise extracting one or more behavior vectors from the observed behavioral information, wherein the observed behavioral information represents n behavioral features and the one or more behavior vectors map the n behavioral features into an n-dimensional space. Furthermore, in various embodiments, the local IoT network that includes the IoT device may be modeled and the analyzed behavioral information may be compared to the modeled local IoT network to determine a current state associated with the local IoT network. For example, modeling the local IoT network may comprise aggregating attributes associated with each IoT device in the local IoT network, constructing a topology associated with the local IoT network, obtaining behavioral models associated with each IoT device in the local IoT network from a manufacturer associated with each IoT device or one or more repositories configured to store the behavioral models, and combining the aggregated attributes associated with each IoT device in the local IoT network, the topology associated with the local IoT network, and the behavioral models associated with each IoT device in the local IoT network to model the local IoT network. As such, the behavioral information observed at the IoT device may be reported to a customer service entity in response to determining that the behavioral information observed at the IoT device indicates anomalous behavior, wherein the anomalous behavior may comprise a potential malicious attack against the IoT device or the local IoT network that includes the IoT device, a potential malfunction or abnormal operating condition at the IoT device, or another issue that may require attention and/or remediation. Furthermore, in various embodiments, the IoT device may comprise at least a first component instrumented to observe the behavioral information and a second component configured to analyze and compare the observed behavioral information to the modeled normal behavior associated with the IoT device (e.g., in a standalone "on-device" architecture), or the IoT device may comprise one or more components instrumented to observe the behavioral information and a transmitter configured to send one or more behavioral features representing the observed behavioral information to an external node configured to analyze and compare the observed behavioral information to the modeled normal behavior associated with the IoT device (e.g., in a distributed architecture). Furthermore, in various embodiments, the local IoT network may further include one or more nodes configured to monitor messages that the IoT device transmits over the local IoT network and to observe the behavioral information at the IoT device according to the monitored messages transmitted over the local IoT network.

According to various aspects, an apparatus for monitoring IoT device health may comprise at least one storage device configured to store information modeling normal behavior associated with at least one IoT device in a local IoT network and one or more processors configured to analyze behavioral information observed at the IoT device and compare the analyzed behavioral information to the modeled normal behavior associated with the IoT device to determine whether the behavioral information observed at the IoT device indicates normal behavior or anomalous behavior.

According to various aspects, an apparatus for monitoring IoT device health may comprise means for modeling normal behavior associated with an IoT device in a local IoT network, means for analyzing behavioral information observed at the IoT device, and means for comparing the analyzed behavioral information to the modeled normal behavior associated with the IoT device to determine whether the behavioral information observed at the IoT device indicates normal behavior or anomalous behavior.

According to various aspects, a computer-readable storage medium may have computer-executable instructions recorded thereon, wherein executing the computer-executable instructions on one or more processors may cause the one or more processors to model normal behavior associated with an IoT device in a local IoT network, analyze behavioral information observed at the IoT device, and compare the analyzed behavioral information to the modeled normal behavior associated with the IoT device to determine whether the behavioral information observed at the IoT device indicates normal behavior or anomalous behavior.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which:

FIGS. 1A-1E illustrate exemplary high-level system architectures of wireless communications systems according to various aspects.

FIG. 8A illustrates an exemplary proximity-based distributed bus that may be formed between two host devices to support D2D communication between the host devices, while

DETAILED DESCRIPTION

Figure 1A:
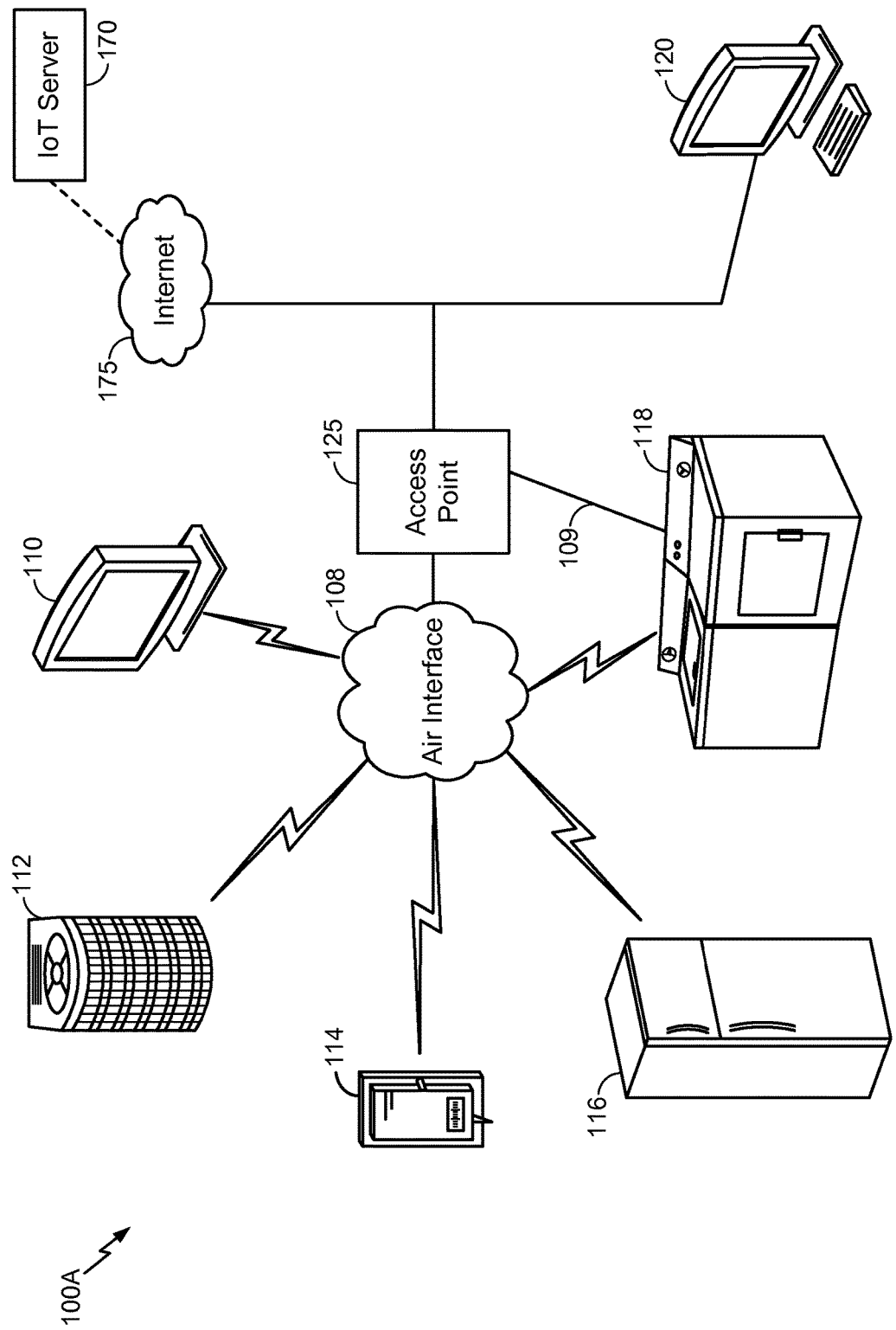

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with various aspects. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In various embodiments, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the direct wired connection 109 using appropriate device-to-device (D2D) communication technology. Alternatively, or additionally, some or all of IoT devices 110-120 may be configured with a communication interface independent of air interface 108 and direct wired connection 109. For example, if the air interface 108 corresponds to a Wi-Fi interface, one or more of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
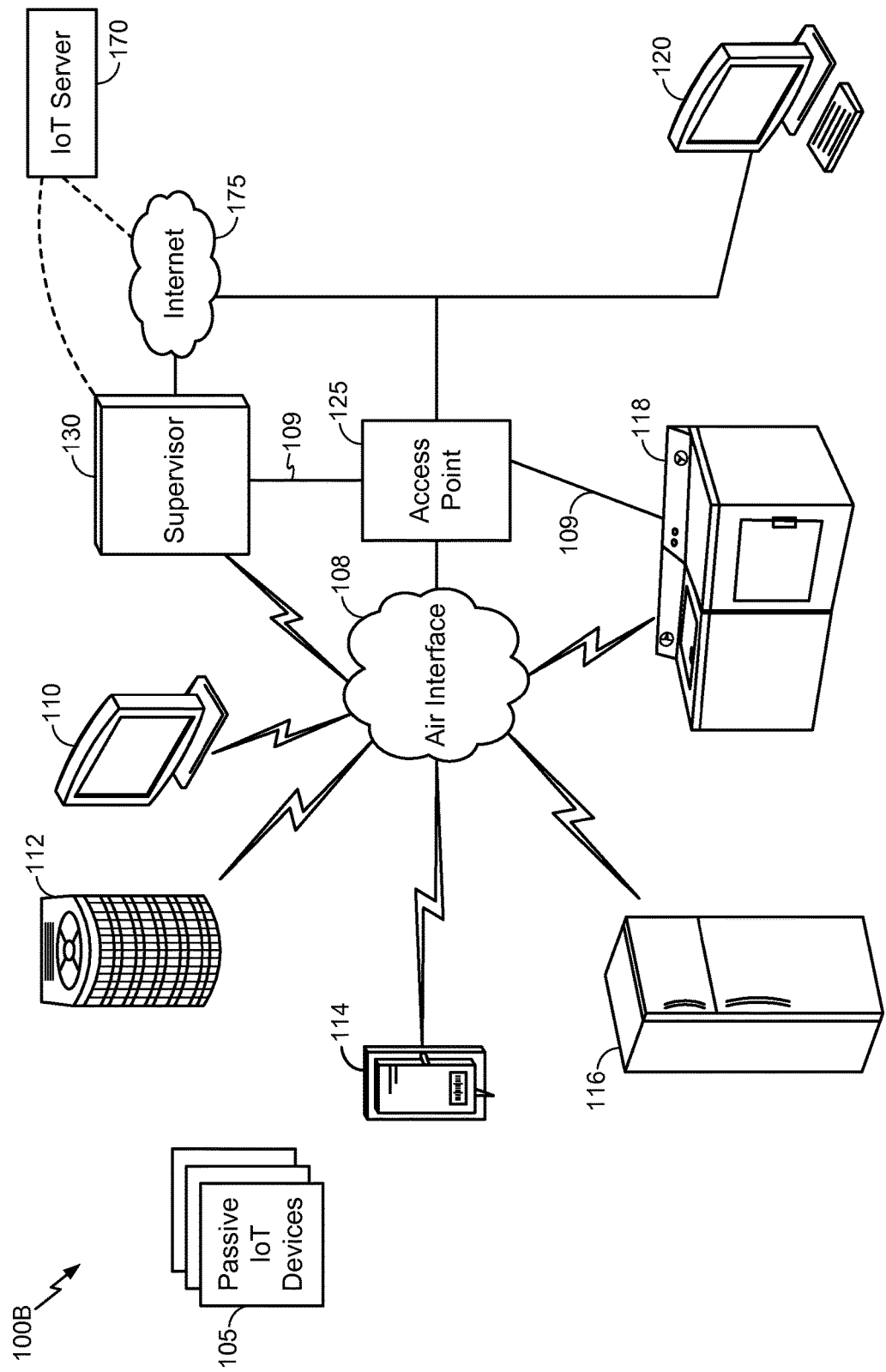

In accordance with various aspects, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In various embodiments, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120.

The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

In accordance with various aspects, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
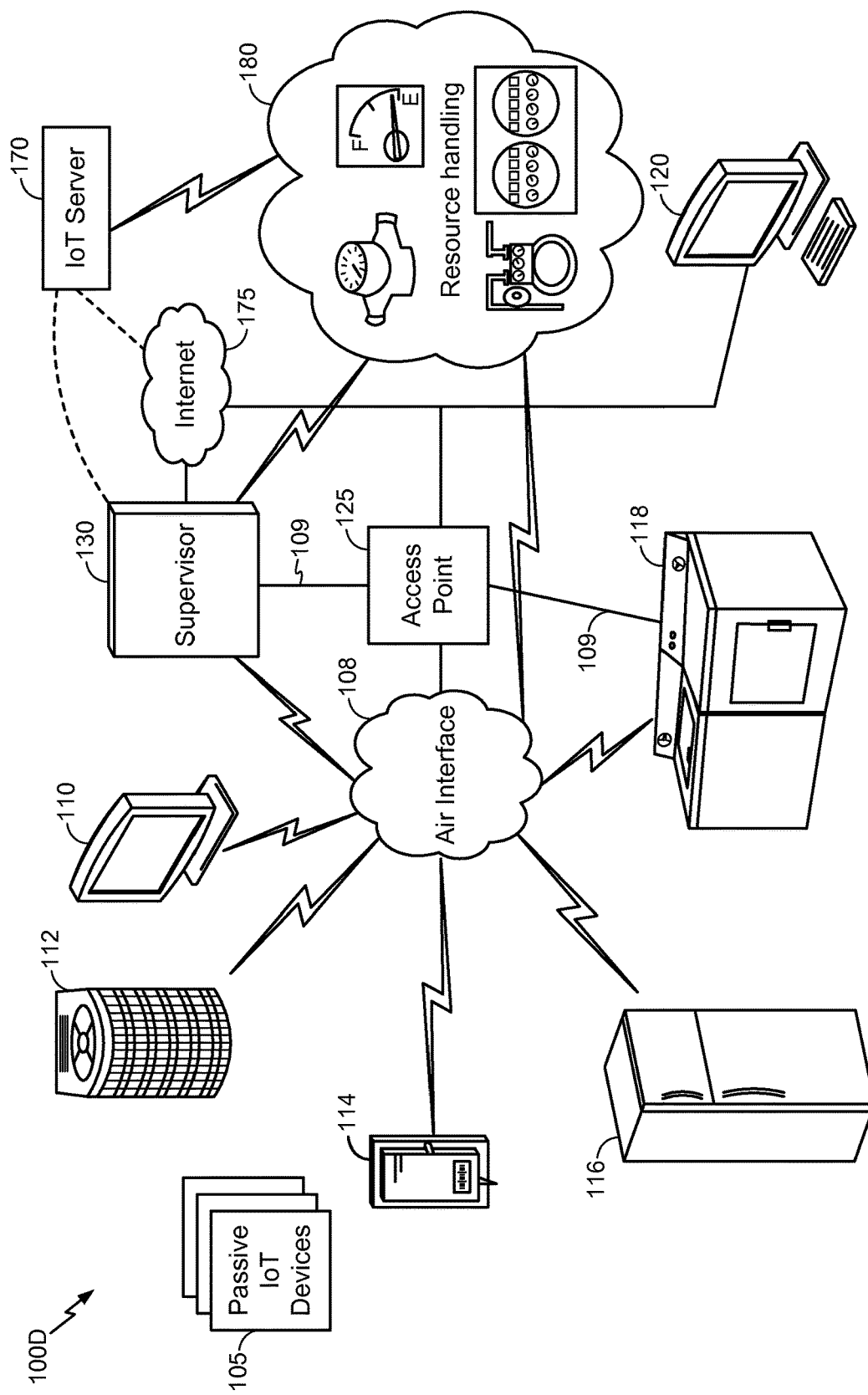

In accordance with various aspects, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-100C shown in FIGS. 1A-1C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-100C illustrated in FIGS. 1A-1C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
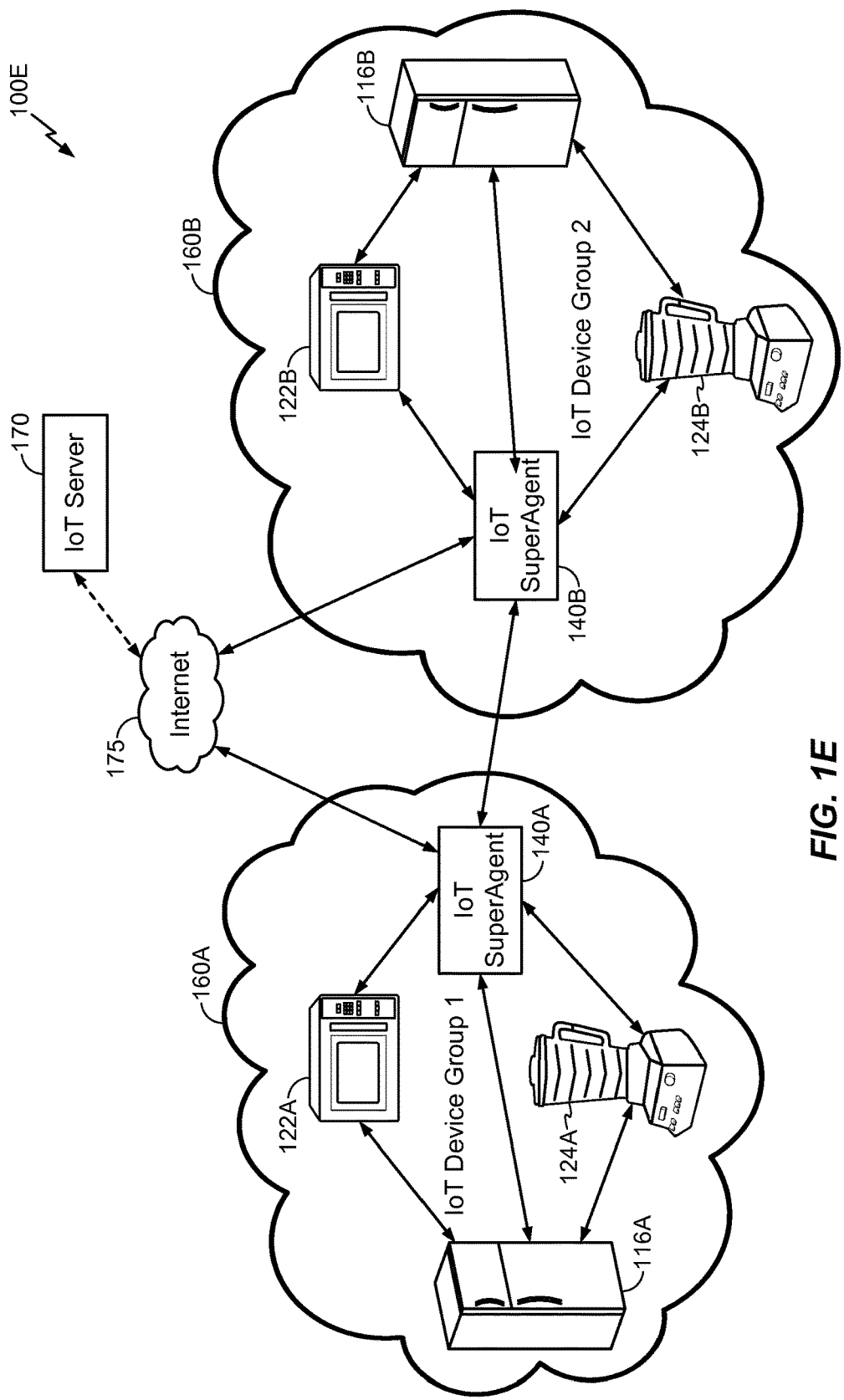

In accordance with various aspects, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-100D shown in FIGS. 1A-1D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-100D illustrated in FIGS. 1A-1D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 140A and 140B, those skilled in the art will appreciate that any number of IoT device groups may suitably communicate with each other using IoT SuperAgents.

Figure 2A:
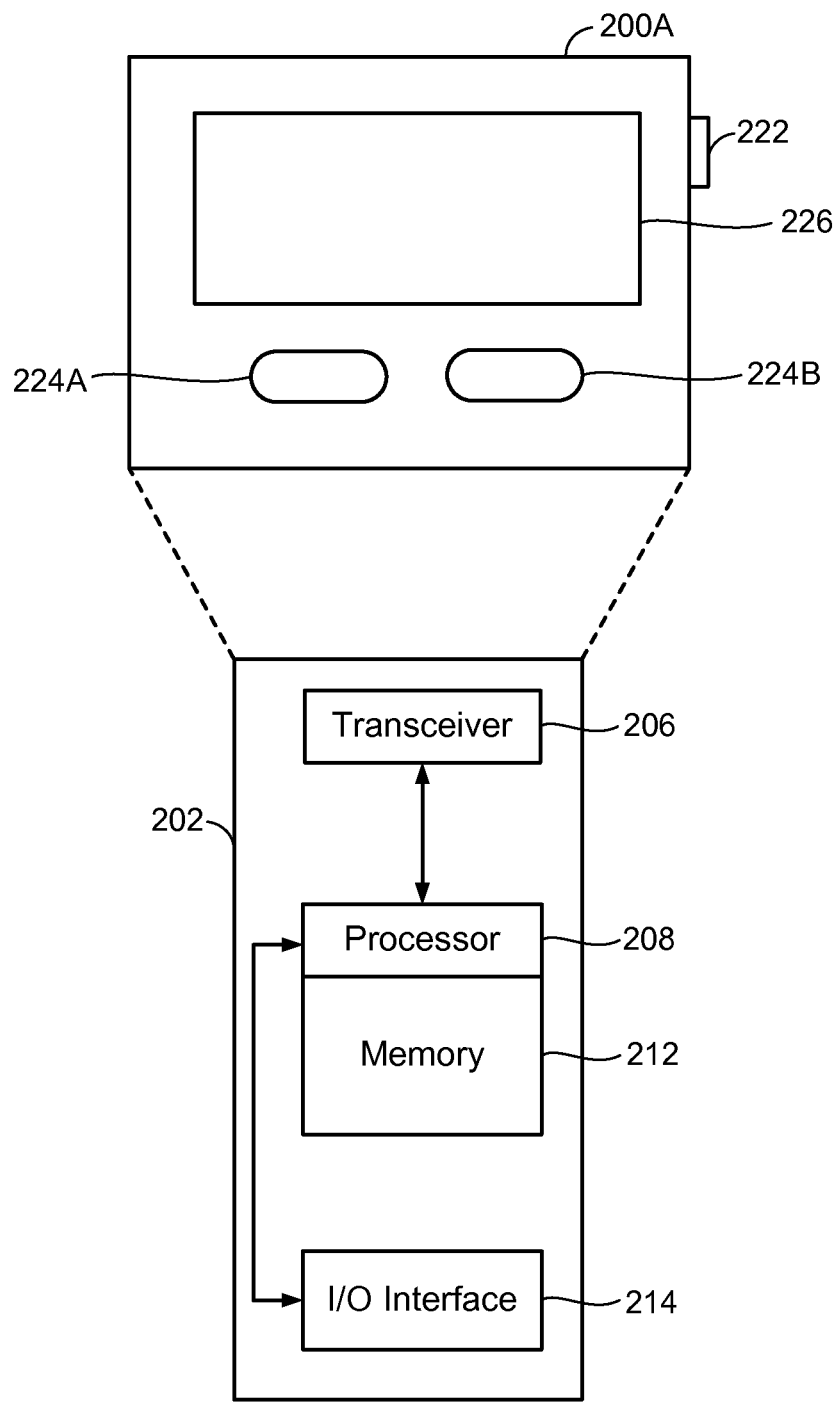
FIG. 2A illustrates an exemplary Internet of Things (IoT) device and FIG. 2B illustrates an exemplary passive IoT device, according to various aspects.

FIG. 2A illustrates a high-level example of an IoT device 200A in accordance with various aspects. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-1B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-1B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, various aspects can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the IoT device 200A is not limited to the illustrated features or arrangement shown in FIG. 2A.

Figure 2B:
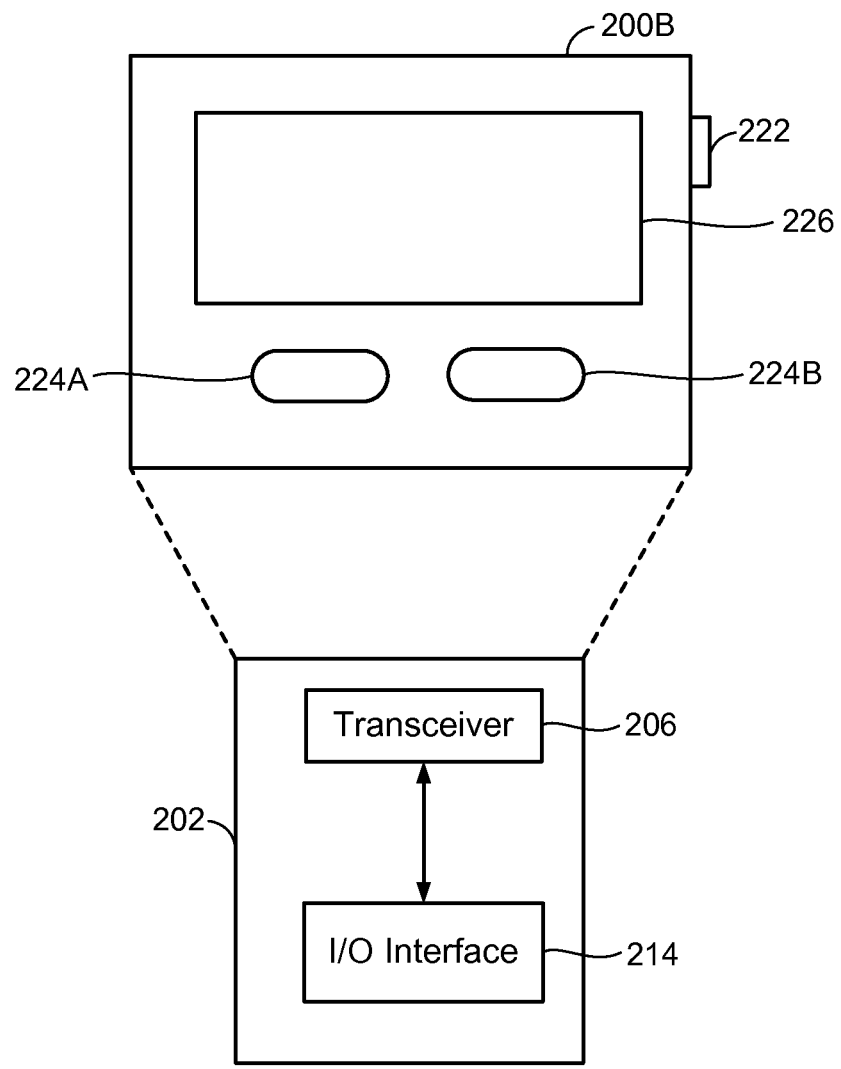

FIG. 2B illustrates a high-level example of a passive IoT device 200B in accordance with various aspects. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in various embodiments, the passive IoT device 200B may only include an I/O interface 214 or other suitable mechanism that allows the passive IoT device 200B to be observed, monitored, controlled, managed, or otherwise known within a controlled IoT network. For example, in various embodiments, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
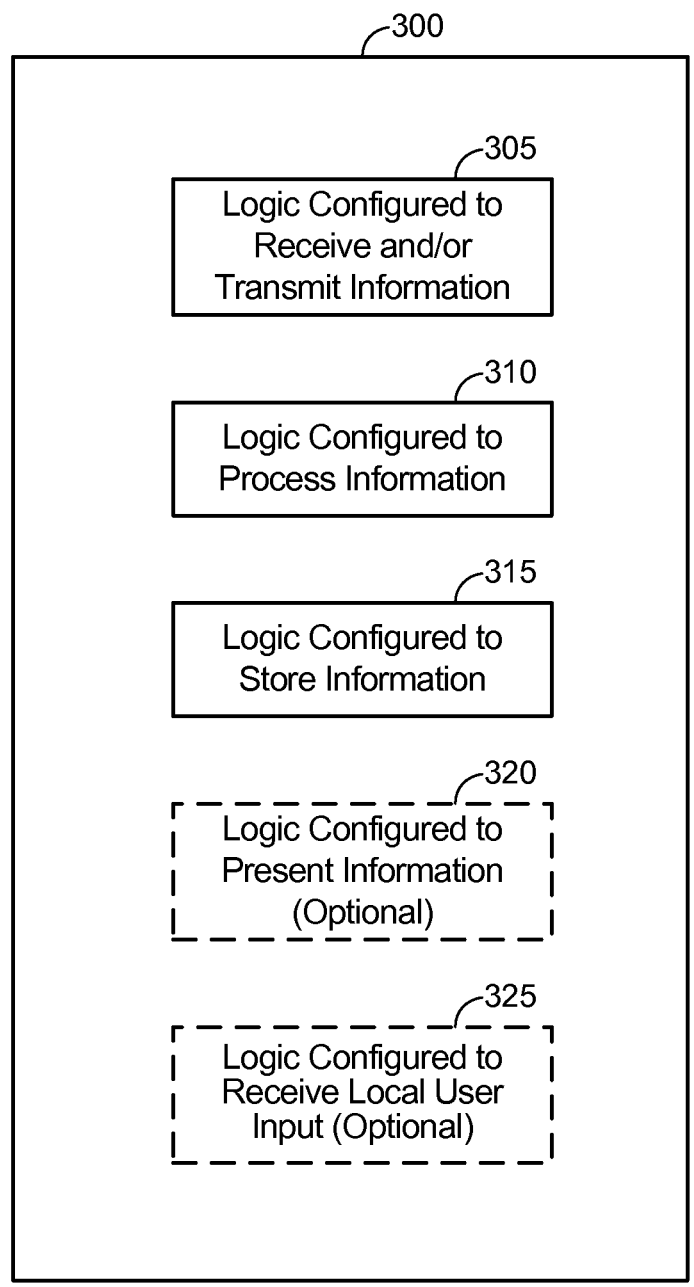
FIG. 3 illustrates a communication device that includes logic configured to perform functionality, according to various aspects.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-100B of FIGS. 1A-1B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the application 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used herein is intended to refer to logic at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
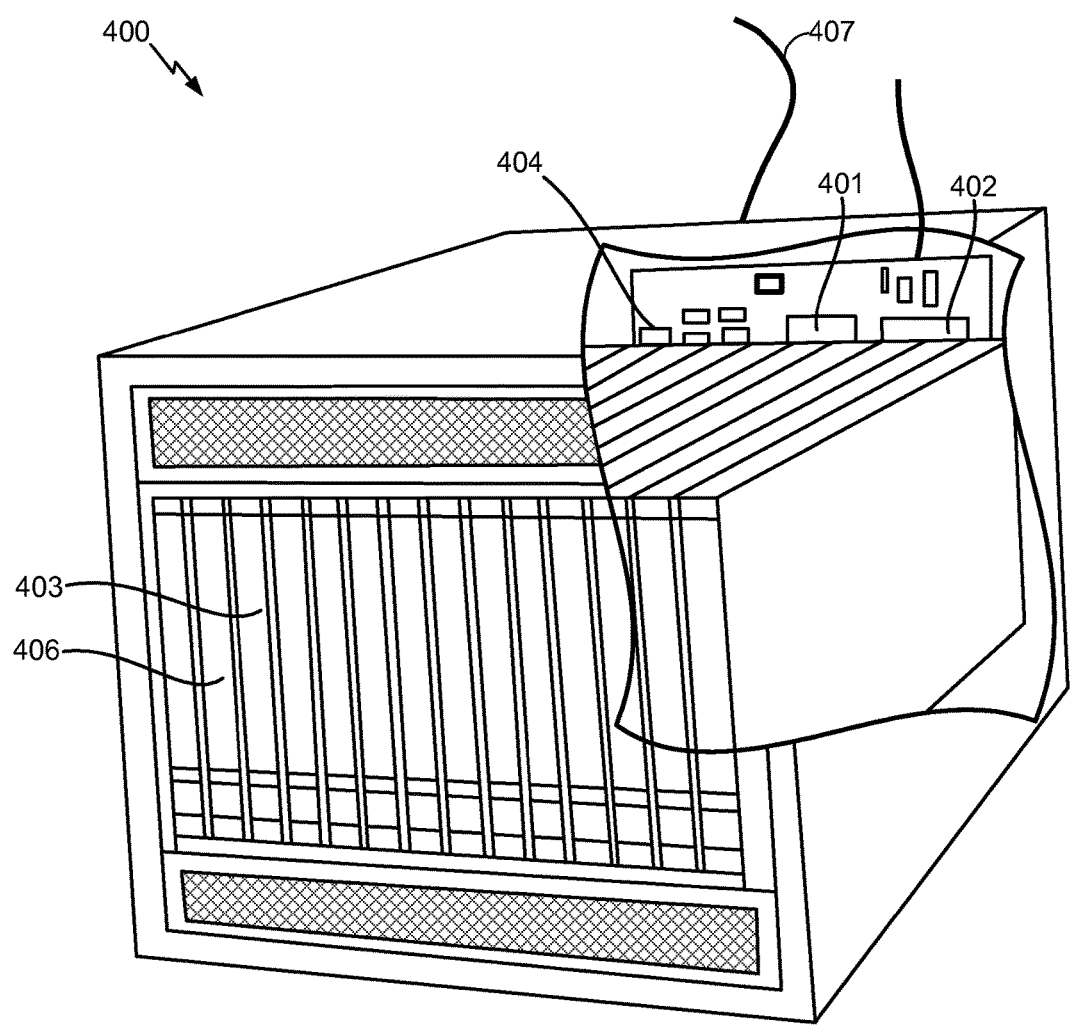
FIG. 4 illustrates an exemplary server, according to various aspects.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

In general, as noted above, IP based technologies and services have become more mature, driving down the cost and increasing availability of IP, which has allowed Internet connectivity to be added to more and more types of everyday electronic objects. As such, the IoT is based on the idea that everyday electronic objects, not just computers and computer networks, can be readable, recognizable, locatable, addressable, and controllable via the Internet. In general, with the development and increasing prevalence of the IoT, numerous proximate heterogeneous IoT devices and other physical objects that have different types and perform different activities (e.g., lights, printers, refrigerators, air conditioners, etc.) may interact with one another in many different ways and be used in many different ways. As such, due to the potentially large number of heterogeneous IoT devices and other physical objects that may be in use within a controlled IoT network, well-defined and reliable communication interfaces are generally needed to connect the various heterogeneous IoT devices such that the various heterogeneous IoT devices can be appropriately configured, managed, and communicate with one another to exchange information, among other things. Accordingly, the following description provided in relation to FIGS. 5-8 generally outlines an exemplary communication framework that may support discoverable device-to-device (D2D) or peer-to-peer (P2P) services that can enable direct D2D communication among heterogeneous devices in a distributed programming environment as disclosed herein.

Figure 5:
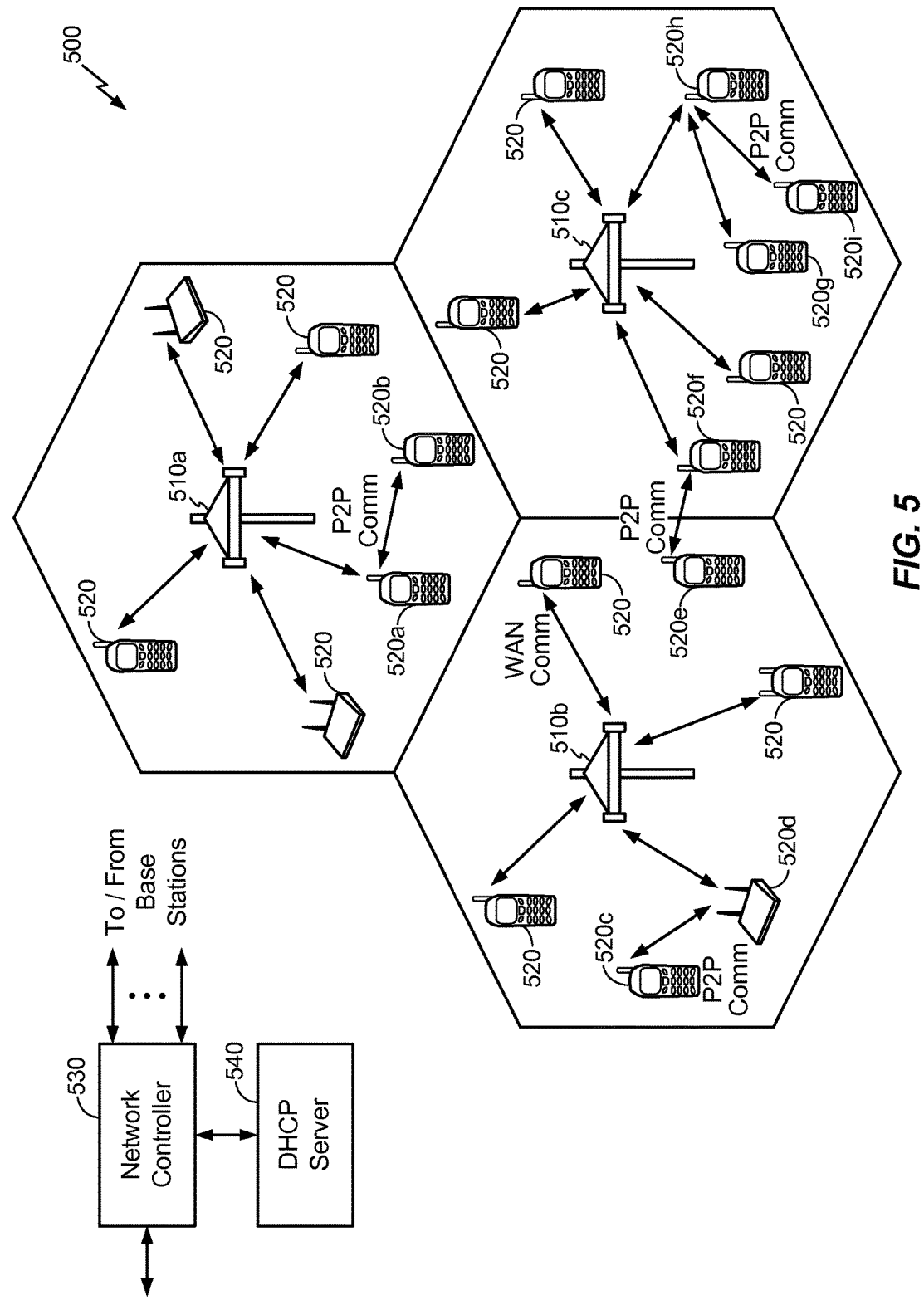
FIG. 5 illustrates a wireless communication network that may support discoverable device-to-device (D2D) (or peer-to-peer (P2P)) services that can enable direct D2D communication, according to various aspects.

In general, user equipment (UE) (e.g., telephones, tablet computers, laptop and desktop computers, vehicles, etc.), can be configured to connect with one another locally (e.g., Bluetooth, local Wi-Fi, etc.), remotely (e.g., via cellular networks, through the Internet, etc.), or according to suitable combinations thereof. Furthermore, certain UEs may also support proximity-based D2D communication using certain wireless networking technologies (e.g., Wi-Fi, Bluetooth, Wi-Fi Direct, etc.) that support one-to-one connections or simultaneously connections to a group that includes several devices directly communicating with one another. To that end, FIG. 5 illustrates an exemplary wireless communication network or WAN 500 that may support discoverable D2D services that can enable direct D2D communication, wherein the wireless communication network 500 may comprise an LTE network or another suitable WAN that includes various base stations 510 and other network entities. For simplicity, only three base stations 510*a*, 510*b* and 510*c*, one network controller 530, and one Dynamic Host Configuration Protocol (DHCP) server 540 are shown in FIG. 5. A base station 510 may be an entity that communicates with devices 520 and may also be referred to as a Node B, an evolved Node B (eNB), an access point, etc. Each base station 510 may provide communication coverage for a particular geographic area and may support communication for the devices 520 located within the coverage area. To improve network capacity, the overall coverage area of a base station 510 may be partitioned into multiple (e.g., three) smaller areas, wherein each smaller area may be served by a respective base station 510. In 3GPP, the term "cell" can refer to a coverage area of a base station 510 and/or a base station subsystem 510 serving this coverage area, depending on the context in which the term is used. In 3GPP2, the term "sector" or "cell-sector" can refer to a coverage area of a base station 510 and/or a base station subsystem 510 serving this coverage area. For clarity, the 3GPP concept of "cell" may be used in the description herein.

A base station 510 may provide communication coverage for a macro cell, a pico cell, a femto cell, and/or other cell types. A macro cell may cover a relatively large geographic area (e.g., several kilometers in radius) and may allow unrestricted access by devices 520 with service subscription. A pico cell may cover a relatively small geographic area and may allow unrestricted access by devices 520 with service subscription. A femto cell may cover a relatively small geographic area (e.g., a home) and may allow restricted access by devices 520 having association with the femto cell (e.g., devices 520 in a Closed Subscriber Group (CSG)). In the example shown in FIG. 5, wireless network 500 includes macro base stations 510*a*, 510*b* and 510*c* for macro cells.

Wireless network 500 may also include pico base stations 510 for pico cells and/or home base stations 510 for femto cells (not shown in FIG. 5).

Network controller 530 may couple to a set of base stations 510 and may provide coordination and control for these base stations 510. Network controller 530 may be a single network entity or a collection of network entities that can communicate with the base stations via a backhaul. The base stations may also communicate with one another (e.g., directly or indirectly via wireless or wireline backhaul). DHCP server 540 may support D2D communication, as described below. DHCP server 540 may be part of wireless network 500, external to wireless network 500, run via Internet Connection Sharing (ICS), or any suitable combination thereof. DHCP server 540 may be a separate entity (e.g., as shown in FIG. 5) or may be part of a base station 510, network controller 530, or some other entity. In any case, DHCP server 540 may be reachable by devices 520 desiring to communicate peer-to-peer.

Devices 520 may be dispersed throughout wireless network 500, and each device 520 may be stationary or mobile. A device 520 may also be referred to as a node, user equipment (UE), a station, a mobile station, a terminal, an access terminal, a subscriber unit, etc. A device 520 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc. A device 520 may communicate with base stations 510 in the wireless network 500 and may further communicate peer-to-peer with other devices 520. For example, as shown in FIG. 5, devices 520*a* and 520*b* may communicate peer-to-peer, devices 520*c* and 520*d* may communicate peer-to-peer, devices 520*e* and 520*f* may communicate peer-to-peer, and devices 520*g*, 520*h*, and 520*i* may communicate peer-to-peer, while remaining devices 520 may communicate with base stations 510. As further shown in FIG. 5, devices 520*a*, 520*d*, 520*f*, and 520*h* may also communicate with base stations 500 (e.g., when not engaged in D2D communication, or possibly concurrent with D2D communication).

In the description herein, WAN communication may refer to communication between a device 520 and a base station 510 in wireless network 500 (e.g., for a call with a remote entity such as another device 520). A WAN device is a device 520 that is interested or engaged in WAN communication. In general, the terms "peer-to-peer" or "P2P" communication and "device-to-device" or "D2D" communication as used herein refers to direct communication between two or more devices 520, without going through any base station 510. For simplicity, the description provided herein uses the term "device-to-device" or "D2D" to refer to such direct communication, although those skilled in the art will appreciate that the terms "peer-to-peer," "P2P," "device-to-device," and "D2D" may be interchangeable in the various aspects and embodiments described herein.

According to various embodiments, a D2D device is a device 520 that is interested or engaged in D2D communication (e.g., a device 520 that has traffic data for another device 520 within proximity of the D2D device). Two devices may be considered to be within proximity of one another, for example, if each device 520 can detect the other device 520. In general, a device 520 may communicate with another device 520 either directly for D2D communication or via at least one base station 510 for WAN communication.

In various embodiments, direct communication between D2D devices 520 may be organized into D2D groups. More particularly, a D2D group generally refers to a group of two or more devices 520 interested or engaged in D2D communication and a D2D link refers to a communication link for a D2D group. Furthermore, in various embodiments, a D2D group may include one device 520 designated a D2D group owner (or a D2D server) and one or more devices 520 designated D2D clients that are served by the D2D group owner. The D2D group owner may perform certain management functions such as exchanging signaling with a WAN, coordinating data transmission between the D2D group owner and D2D clients, etc. For example, as shown in FIG. 5, a first D2D group includes devices 520a and 520b under the coverage of base station 510a, a second D2D group includes devices 520c and 520d under the coverage of base station 510b, a third D2D group includes devices 520e and 520f under the coverage of different base stations 510b and 510c, and a fourth D2D group includes devices 520g, 520h and 520i under the coverage of base station 510c. Devices 520a, 520d, 520f, and 520h may be D2D group owners for their respective D2D groups and devices 520b, 520c, 520e, 520g, and 520i may be D2D clients in their respective D2D groups. The other devices 520 in FIG. 5 may be engaged in WAN communication.

In various embodiments, D2D communication may occur only within a D2D group and may further occur only between the D2D group owner and the D2D clients associated therewith. For example, if two D2D clients within the same D2D group (e.g., devices 520g and 520i) desire to exchange information, one of the D2D clients may send the information to the D2D group owner (e.g., device 520h) and the D2D group owner may then relay transmissions to the other D2D client. In various embodiments, a particular device 520 may belong to multiple D2D groups and may behave as either a D2D group owner or a D2D client in each D2D group. Furthermore, in various embodiments, a particular D2D client may belong to only one D2D group or belong to multiple D2D group and communicate with D2D devices 520 in any of the multiple D2D groups at any particular moment. In general, communication may be facilitated via transmissions on the downlink and uplink. For WAN communication, the downlink (or forward link) refers to the communication link from base stations 510 to devices 520, and the uplink (or reverse link) refers to the communication link from devices 520 to base stations 510. For D2D communication, the D2D downlink refers to the communication link from D2D group owners to D2D clients and the D2D uplink refers to the communication link from D2D clients to D2D group owners. In various embodiments, rather than using WAN technologies to communicate D2D, two or more devices may form smaller D2D groups and communicate D2D on a wireless local area network (WLAN) using technologies such as Wi-Fi, Bluetooth, or Wi-Fi Direct. For example, D2D communication using Wi-Fi, Bluetooth, Wi-Fi Direct, or other WLAN technologies may enable D2D communication between two or more mobile phones, game consoles, laptop computers, or other suitable communication entities.

Figure 6:
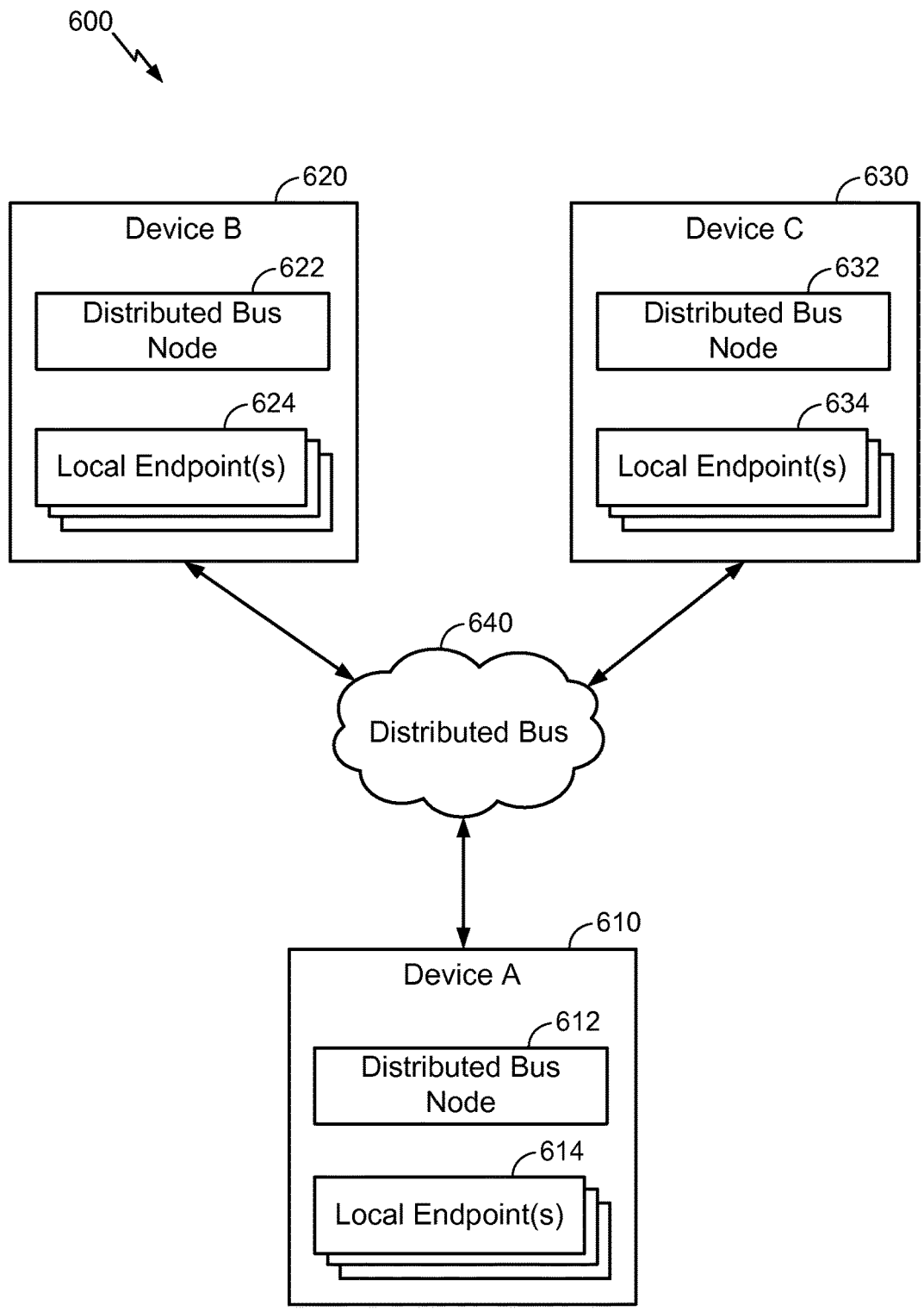
FIG. 6 illustrates an exemplary environment in which discoverable D2D services may be used to establish a proximity-based distributed bus over which various devices may communicate using D2D technology, according to various aspects.

According to various aspects, FIG. 6 illustrates an exemplary environment 600 in which discoverable D2D services may be used to establish a proximity-based distributed bus 640 over which various devices 610, 620, 630 may communicate using D2D technology. For example, in various embodiments, communications between applications and the like, on a single platform may be facilitated using an interprocess communication protocol (IPC) framework over the distributed bus 640, which may comprise a software bus used to enable application-to-application communications in a networked computing environment where applications register with the distributed bus 640 to offer services to other applications and other applications query the distributed bus 640 for information about registered applications. Such a protocol may provide asynchronous notifications and remote procedure calls (RPCs) in which signal messages (e.g., notifications) may be point-to-point or broadcast, method call messages (e.g., RPCs) may be synchronous or asynchronous, and the distributed bus 640 may handle message routing between the various devices 610, 620, 630 (e.g., via one or more bus routers or "daemons" or other suitable processes that may provide attachments to the distributed bus 640).

In various embodiments, the distributed bus 640 may be supported by a variety of transport protocols (e.g., Bluetooth, TCP/IP, Wi-Fi, CDMA, GPRS, UMTS, etc.). For example, according to various aspects, a first device 610 may include a distributed bus node 612 and one or more local endpoints 614, wherein the distributed bus node 612 may facilitate communications between local endpoints 614 associated with the first device 610 and local endpoints 624 and 634 associated with a second device 620 and a third device 630 through the distributed bus 640 (e.g., via distributed bus nodes 622 and 632 on the second device 620 and the third device 630). As will be described in further detail below with reference to FIG. 7, the distributed bus 640 may support symmetric multi-device network topologies and may provide a robust operation in the presence of device drops-outs. As such, the virtual distributed bus 640, which may generally be independent from any underlying transport protocol (e.g., Bluetooth, TCP/IP, Wi-Fi, etc.) may allow various security options, from unsecured (e.g., open) to secured (e.g., authenticated and encrypted), wherein the security options can be used while facilitating spontaneous connections among the first device 610, the second device 620, and the third device 630 without intervention when the various devices 610, 620, 630 come into range or proximity to each other.

Figure 7:
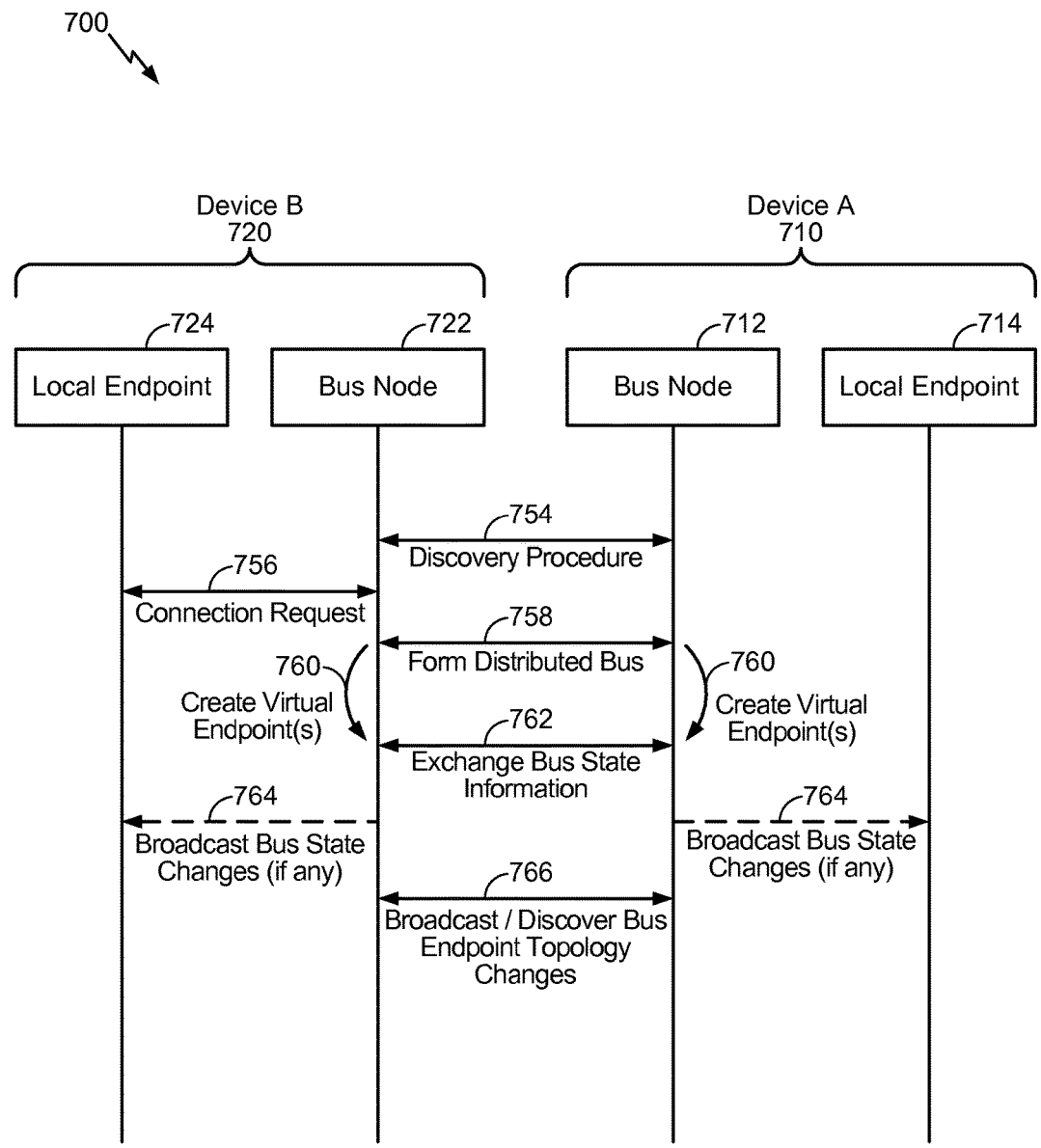
FIG. 7 illustrates an exemplary signaling flow in which discoverable D2D services may be used to establish a proximity-based distributed bus over which various devices may communicate using D2D technology, according to various aspects.

According to various aspects, FIG. 7 illustrates an exemplary signaling flow 700 in which discoverable D2D services may be used to establish a proximity-based distributed bus over which a first device ("Device A") 710 and a second device ("Device B") 720 may communicate using D2D technology. For example, in the signaling flow 700 shown in FIG. 7, Device A 710 may request to communicate with Device B 720, wherein Device A 710 may a include local endpoint 714 (e.g., a local application, service, etc.), which may make a request to communicate in addition to a bus node 712 that may assist in facilitating such communications. Further, Device B 720 may include a local endpoint 724 with which the local endpoint 714 may be attempting to communicate in addition to a bus node 722 that may assist in facilitating communications between the local endpoint 714 on the Device A 710 and the local endpoint 724 on Device B 720.

In various embodiments, the bus nodes 712 and 722 may perform a suitable discovery mechanism at 754. For example, mechanisms for discovering connections supported by Bluetooth, TCP/IP, UNIX, or the like may be used. At 756, the local endpoint 714 on Device A 710 may request to connect to an entity, service, endpoint etc., available through bus node 712. In various embodiments, the request may include a request-and-response process between local endpoint 714 and bus node 712. At 758, a distributed message bus may be formed to connect bus node 712 to bus node 722 and thereby establish a D2D connection between Device A 710 and Device B 720. In various embodiments, communications to form the distributed bus between the bus nodes 712 and 722 may be facilitated using a suitable proximity-based D2D protocol (e.g., the AllJoyn™ software framework designed to enable interoperability among connected products and software applications from different manufacturers to dynamically create proximal networks and facilitate proximal D2D communication). Alternatively, in various embodiments, a server (not shown) may facilitate the connection between the bus nodes 712 and 722. Furthermore, in various embodiments, a suitable authentication mechanism may be used prior to forming the connection between bus nodes 712 and 722 (e.g., SASL authentication in which a client may send an authentication command to initiate an authentication conversation). Still further, at 758, bus nodes 712 and 722 may exchange information about other available endpoints (e.g., local endpoints 634 on Device C 630 in FIG. 6). In such embodiments, each local endpoint that a bus node maintains may be advertised to other bus nodes, wherein the advertisement may include unique endpoint names, transport types, connection parameters, or other suitable information.

In various embodiments, at 760, bus node 712 and bus node 722 may use obtained information associated with the local endpoints 724 and 714, respectively, to create virtual endpoints that may represent the real obtained endpoints available through various bus nodes. In various embodiments, message routing on the bus node 712 may use real and virtual endpoints to deliver messages. Further, there may one local virtual endpoint for every endpoint that exists on remote devices (e.g., Device A 710). Still further, such virtual endpoints may multiplex and/or de-multiplex messages sent over the distributed bus (e.g., a connection between bus node 712 and bus node 722). In various embodiments, virtual endpoints may receive messages from the local bus node 712 or 722, just like real endpoints, and may forward messages over the distributed bus. As such, the virtual endpoints may forward messages to the local bus nodes 712 and 722 from the endpoint multiplexed distributed bus connection. Furthermore, in various embodiments, virtual endpoints that correspond to virtual endpoints on a remote device may be reconnected at any time to accommodate desired topologies of specific transport types. In such embodiments, UNIX based virtual endpoints may be considered local and as such may not be considered candidates for reconnection. Further, TCP-based virtual endpoints may be optimized for one hop routing (e.g., each bus node 712 and 722 may be directly connected to each other). Still further, Bluetooth-based virtual endpoints may be optimized for a single pico-net (e.g., one master and n slaves) in which the Bluetooth-based master may be the same bus node as a local master node.

In various embodiments, the bus node 712 and the bus node 722 may exchange bus state information at 762 to merge bus instances and enable communication over the distributed bus. For example, in various embodiments, the bus state information may include a well-known to unique endpoint name mapping, matching rules, routing group, or other suitable information. In various embodiments, the state information may be communicated between the bus node 712 and the bus node 722 instances using an interface with local endpoints 714 and 724 communicating with using a distributed bus based local name. In another aspect, bus node 712 and bus node 722 may each may maintain a local bus controller responsible for providing feedback to the distributed bus, wherein the bus controller may translate global methods, arguments, signals, and other information into the standards associated with the distributed bus. The bus node 712 and the bus node 722 may communicate (e.g., broadcast) signals at 764 to inform the respective local endpoints 714 and 724 about any changes introduced during bus node connections, such as described above. In various embodiments, new and/or removed global and/or translated names may be indicated with name owner changed signals. Furthermore, global names that may be lost locally (e.g., due to name collisions) may be indicated with name lost signals. Still further, global names that are transferred due to name collisions may be indicated with name owner changed signals and unique names that disappear if and/or when the bus node 712 and the bus node 722 become disconnected may be indicated with name owner changed signals.

As used above, well-known names may be used to uniquely describe local endpoints 714 and 724. In various embodiments, when communications occur between Device A 710 and Device B 720, different well-known name types may be used. For example, a device local name may exist only on the bus node 712 associated with Device A 710 to which the bus node 712 directly attaches. In another example, a global name may exist on all known bus nodes 712 and 722, where only one owner of the name may exist on all bus segments. In other words, when the bus node 712 and bus node 722 are joined and any collisions occur, one of the owners may lose the global name. In still another example, a translated name may be used when a client is connected to other bus nodes associated with a virtual bus. In such embodiments, the translated name may include an appended end (e.g., a local endpoint 714 with well-known name "org.foo" connected to the distributed bus with Globally Unique Identifier "1234" may be seen as "G1234.org.foo").

In various embodiments, the bus node 712 and the bus node 722 may communicate (e.g., broadcast) signals at 766 to inform other bus nodes of changes to endpoint bus topologies. Thereafter, traffic from local endpoint 714 may move through virtual endpoints to reach intended local endpoint 724 on Device B 720. Further, in operation, communications between local endpoint 714 and local endpoint 724 may use routing groups. In various embodiments, routing groups may enable endpoints to receive signals, method calls, or other suitable information from a subset of endpoints. As such, a routing name may be determined by an application connected to a bus node 712 or 722. For example, a D2D application may use a unique, well-known routing group name built into the application. Further, bus nodes 712 and 722 may support registering and/or de-registering of local endpoints 714 and 724 with routing groups. In various embodiments, routing groups may have no persistence beyond a current bus instance. In another aspect, applications may register for their preferred routing groups each time they connect to the distributed bus. Still further, groups may be open (e.g., any endpoint can join) or closed (e.g., only the creator of the group can modify the group). Yet further, a bus node 712 or 722 may send signals to notify other remote bus nodes or additions, removals, or other changes to routing group endpoints. In such embodiments, the bus node 712 or 722 may send a routing group change signal to other group members whenever a member is added and/or removed from the group. Further, the bus node 712 or 722 may send a routing group change signal to endpoints that disconnect from the distributed bus without first removing themselves from the routing group.

Figure 8A:
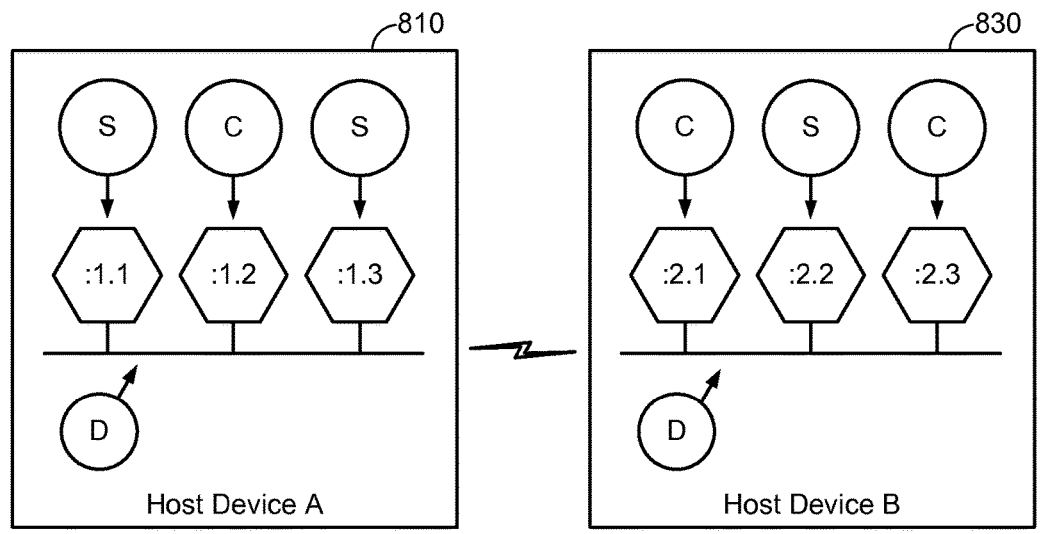

According to various aspects, FIG. 8A illustrates an exemplary proximity-based distributed bus that may be formed between a first host device 810 and a second host device 830 to enable D2D communication between the first host device 810 and the second host device 830. More particularly, as described above with respect to FIG. 6, the basic structure of the proximity-based distributed bus may comprise multiple bus segments that reside on separate physical host devices. Accordingly, in FIG. 8A, each segment of the proximity-based distributed bus may be located on one of the host devices 810, 830, wherein the host devices 810, 830 each execute a local bus router (or "daemon") that may implement the bus segments located on the respective host device 810, 830. For example, in FIG. 8A, each host device 810, 830 includes a bubble labeled "D" to represent the bus router that implements the bus segments located on the respective host device 810, 830. Furthermore, one or more of the host devices 810, 830 may have several bus attachments, where each bus attachment connects to the local bus router. For example, in FIG. 8A, the bus attachments on host devices 810, 830 are illustrated as hexagons that each correspond to either a service (S) or a client (C) that may request a service.

Figure 8B:
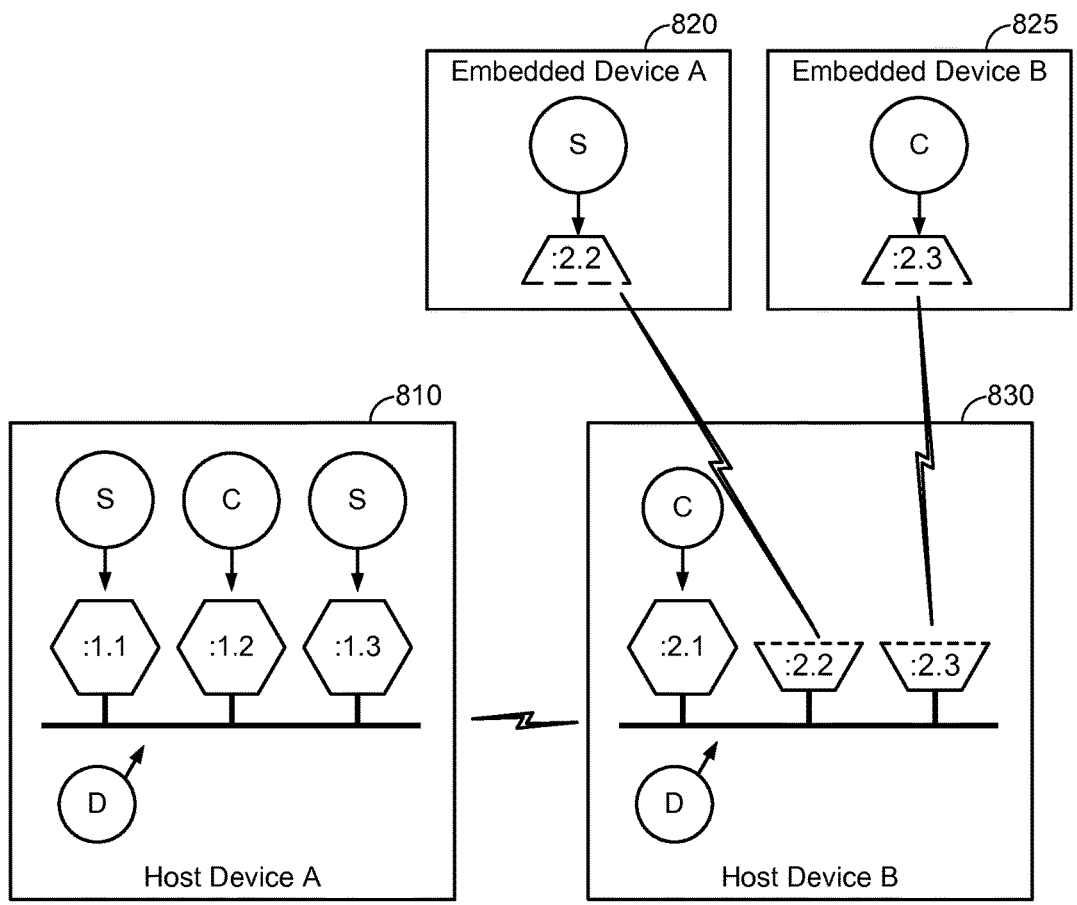
FIG. 8B illustrates an exemplary proximity-based distributed bus in which one or more embedded devices may connect to a host device to connect to the proximity-based distributed bus, according to various aspects.

However, in certain cases, embedded devices may lack sufficient resources to run a local bus router. Accordingly, FIG. 8B illustrates an exemplary proximity-based distributed bus in which one or more embedded devices 820, 825 can connect to a host device (e.g., host device 830) to connect to the proximity-based distributed bus and thereby engage in D2D communication (e.g., with the host device 830 or with other host devices 810 and/or embedded devices 825 that are attached to the proximity-based distributed bus via the host device 830). As such, the embedded devices 820, 825 may generally "borrow" the bus router running on the host device 830, whereby FIG. 8B shows an arrangement where the embedded devices 820, 825 are physically separate from the host device 830 running the borrowed bus router that manages the distributed bus segment on which the embedded devices 820, 825 reside. In general, the connection between the embedded devices 820, 825 and the host device 830 may be made according to the Transmission Control Protocol (TCP) and the network traffic flowing between the embedded devices 820, 825 and the host device 830 may comprise messages that implement bus methods, bus signals, and properties flowing over respective sessions in a similar manner to that described in further detail above with respect to FIGS. 6 and 7.

More particularly, the embedded devices 820, 825 may connect to the host device 830 according to a discovery and connection process that may be conceptually similar to the discovery and connection process between clients and services, wherein the host device 830 may advertise a well-known name (e.g., "org.alljoyn.BusNode") that signals an ability or willingness to host the embedded devices 820, 825. In one use case, the embedded devices 820, 825 may simply connect to the "first" host device that advertises the well-known name. However, if the embedded devices 820, 825 simply connect to the first host device that advertises the well-known name, the embedded devices 820, 825 may not have any knowledge about the type associated with the host device (e.g., whether the host device 830 is a mobile device, a set-top box, an access point, etc.), nor would the embedded devices 820, 825 have any knowledge about the load status on the host device. Accordingly, in other use cases, the embedded devices 820, 825 may adaptively connect to the host device 830 based on information that the host devices 810, 830 provide when advertising the ability or willingness to host other devices (e.g., embedded devices 820, 825), which may thereby join the proximity-based distributed bus according to properties associated with the host devices 810, 830 (e.g., type, load status, etc.) and/or requirements associated with the embedded devices 820, 825 (e.g., a ranking table that expresses a preference to connect to a host device from the same manufacturer).

According to various aspects, as will be described in further detail herein, the fact that IoT environments are expected to typically include various heterogeneous devices with different capabilities can be leveraged to conduct direct and indirect behavioral analysis to detect potentially malicious attacks against one or more devices in an IoT environment and to monitor device health and detect malfunctions or other anomalies such that customer service in IoT environments can be automated and made cheaper, easier, and faster from both a manufacturer perspective and a customer perspective. For example, many anomalies can be detected and analyzed based on some basic observations (e.g., power drawn over a particular time period, sensor measurements indicating local and/or ambient temperature, water levels, smoke levels, carbon dioxide and/or carbon monoxide levels, visibility levels, vibrations measured with an inertial measurement unit (IMU), etc.).

Accordingly, considering the fact that many IoT devices are simple devices that have relatively limited behaviors (e.g., toasters, thermostats, laundry machines, televisions, light fixtures, and other everyday objects), most (if not all) devices in an IoT environment can be assumed to at least have the capability to observe certain local behaviors (e.g., power consumption, sensor outputs, etc.). Furthermore, even though all devices in a certain IoT environment may not have sufficient processing resources, storage resources, and/or other capabilities to conduct behavioral analysis, most (if not all) appliances and other devices in a smart connected IoT environment can be expected to have the capability to communicate over a network and therefore have the capability to send locally observed behaviors to more powerful devices (e.g., according to the communication framework described above with respect to FIGS. 5-8, which may enable direct D2D communication among heterogeneous devices in a distributed programming environment). Accordingly, in an IoT environment having a distributed architecture, one or more devices in the IoT environment that are more powerful (e.g., a smartphone, an "always-on" wireless router, etc.) can aggregate behaviors that other (e.g., simpler) devices observe locally and/or conduct behavioral analysis across the distributed IoT environment in order to detect anomalies that may potentially indicate malicious attacks or malfunctions that require customer service. Furthermore, the more powerful devices in the IoT environment may conduct on-device (local) behavioral analysis to detect anomalous conditions without having to send locally observed behaviors to another aggregator and/or analyzer device.

Figure 9:
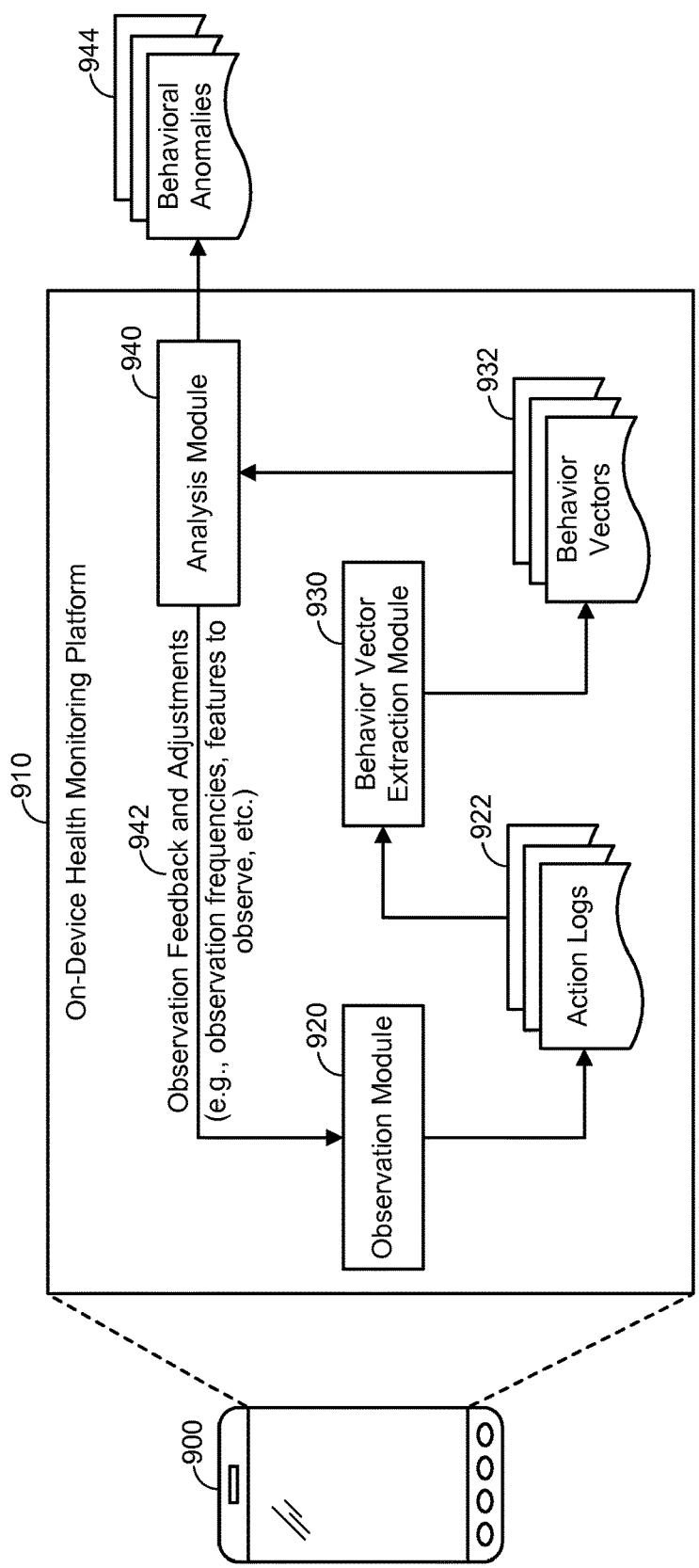
FIG. 9 illustrates an exemplary on-device architecture that may support behavioral analysis to automate local device health monitoring, according to various aspects.

Accordingly, FIG. 9 illustrates an exemplary IoT device 900 with adequate storage resources, processing resources, and/or other capabilities to conduct on-device behavioral analysis and thereby detect anomalous conditions from a local perspective. However, those skilled in the art will appreciate that the IoT device 900 shown in FIG. 9 may alternatively and/or additionally send locally observed and/or analyzed behaviors to one or more aggregator devices and/or analyzer devices in various embodiments (e.g., where the IoT device is associated with a distributed IoT environment such that behaviors locally observed and/or analyzed at the device 900 can be considered in a broader context with respect to one or more other devices in the distributed IoT environment and/or with respect to the distributed IoT environment as a whole). Furthermore, although the IoT device 900 has the appearance of a smartphone in FIG. 9, those skilled in the art will appreciate that the IoT device 900 shown therein may comprise any suitable device that has sufficient storage resources, processing resources, and/or other capabilities to conduct on-device behavioral analysis (e.g., a tablet, a wireless gateway, a desktop computer, appliances with substantial storage and processing resources, etc.).

In various embodiments, in order to enable the on-device behavioral analysis, the IoT device 900 may comprise an on-device health monitoring platform 910 that includes at least an observation module 920, a behavior vector extraction module 930, and an analysis module 940. More particularly, the IoT device 900 can be assumed to comprise one or more sensors, measurement hardware, or other suitable components through which the IoT device 900 can monitor a local environment associated therewith (e.g., an accelerometer that can measure acceleration and tilt, a temperature sensor that can measure internal and/or ambient temperatures, a photosensor that can detect light, an antenna that can monitor local wireless signals, instrumentation that can detect processor activity, network activity, etc.). Accordingly, in various embodiments, the observation module 920 may be configured to monitor or otherwise collect local behavioral information on the IoT device 900 through one or more application program interface (API) calls and minimal instrumentation at one or multiple levels in a mobile stack. The observation module 920 may therefore utilize fast and efficient in-memory processing to monitor, measure, or otherwise observe behavioral information associated with the IoT device 900 (e.g., heartbeats, sensor measurements, power consumption, test results, etc.) and generate one or more action logs 922 that comprise one or more "features" describing the observed behavioral terms in concise terms.

In various embodiments, the observation module 920 may then pass the one or more action logs 922 that include the features describing the observed behavioral information to the behavior vector extraction module 930, which may then map the features contained in the action logs 922 into an n-dimensional space in order to extract one or more behavior vectors 932 that represent the observed behaviors on the IoT device 900. Accordingly, the behavior vectors 932 may each have a size n, where each number in the behavior vectors 932 represents the value associated with one feature (or observed behavior). For example, assuming that IoT device 900 comprises a smartphone and the features contained in the action logs 922 describe power consumption (e.g., according to milliamps (mA) consumed at the battery), an internal temperature, processor usage (e.g., according to a percentage), and network connectivity in a particular observation period, an exemplary behavior vector 932 that the behavior vector extraction module 930 generates may have the following form, where n equals four in the illustrated example:

TABLE 1

Example On-Device Behavior Vector

| Feature | power_consumption | temperature_internal | cpu_usage | internet_connectivity |
|---|---|---|---|---|
| Value | 0.25 | 78 | 30 | 1 |

In various embodiments, the one or more behavior vectors 932 generated at the behavior vector extraction module 930 may then be provided to the analysis module 940, wherein the one or more behavior vectors 932 may include different feature sets according to different observation granularities. For example, in the exemplary behavior vector 932 shown above, the power_consumption, temperature_internal, and cpu_usage features have precise values whereas the internet_connectivity comprises a binary value, whereby the power_consumption, temperature_internal, and cpu_usage features have a finer granularity than the internet_connectivity feature. Accordingly, the analysis module 940 may aggregate the behavior vectors 932 that include one or more feature sets that can exhibit different observation granularities, wherein the analysis module 940 may analyze the aggregated behavior vectors 932 to detect one or more behavioral anomalies 944 that could indicate a potential malicious attack against the IoT device 900, malfunction or burn-out at the IoT device 900, or other anomalies 944 that may require further investigation, customer service, or other remediation. For example, in various embodiments, the analysis module 940 may analyze the aggregated behavior vectors 932 generated at the behavior vector extraction module 930 according to a comparison with a model specific to a make, version, etc. associated with the IoT device 900, wherein the model used in the comparison with the aggregated behavior vectors 932 may be obtained from a manufacturer associated with the IoT device 900 or other suitable repositories (e.g., a repository on a local IoT network that includes one or more models associated with other IoT devices that are identical or similar to the IoT device 900). Alternatively (or additionally), the model used in the comparison may comprise an overall state model associated with the local IoT network (e.g., where the "internet_connectivity" feature has a zero value to indicate that network connectivity was not present during the observation interval, the fact that network connectivity did not exist may not reflect a behavioral anomaly 944 if the overall state model associated with the local IoT network indicates a malfunction at the home gateway such that all devices in the local IoT network can be expected to have network connectivity problems).

Accordingly, the analysis module 940 does not necessarily detect the behavioral anomalies 944 based on any one feature in the behavior vectors 932. Instead, the analysis module 944 may use machine learning to detect the behavioral anomalies 944 through evaluating the features in the behavior vectors 932 in combination. Furthermore, in various embodiments, the analysis module 940 may build a model representing normal behavior associated with the IoT device 900 over time, wherein the model representing the normal behavior associated with the IoT device 900 may be built over time based on the model obtained from the manufacturer associated with the IoT device 900, the behavior vectors 932 generated in the on-device health monitoring platform 910, behavior vectors and/or models corresponding to other devices in the local IoT network, behavior vectors and/or models corresponding to inputs and interactions from one or more users associated with the local IoT network, the overall state model associated with the local IoT network, and/or any other suitable information that may have relevance to assessing normal behavior versus anomalous behavior on the IoT device 900.

Furthermore, in various embodiments, the analysis module 940 may invoke online troubleshooting, on-device diagnostics, or other remediation techniques in response to detecting one or more behavioral anomalies 944 from the analyzed behavior vectors 932. For example, in one embodiment, the analysis module 940 may invoke a request/response system to enable back and forth messaging between the IoT device 900 and customer service such that more information can be gathered (e.g., the analysis module 940 may act as a router between the IoT device 900 and customer service). In another example, the analysis module 940 may notify another aggregator and/or analyzer node in the local IoT network to request assistance with remediating the behavioral anomalies 944 (e.g., in the event that the behavioral anomalies 944 are severe such that the IoT device 900 cannot conduct the remediation locally) and/or to assist with building the overall state associated with the local IoT network. In the above-mentioned use cases, the analysis module 940 may further provide the relevant behavior vectors 932 (or features contained therein) from which the behavioral anomalies 944 were detected. Moreover, based on the analyzed behavior vectors 932, the analysis module 940 may provide observation feedback and adjustments 942 to configure the observation module 940. For example, the observation feedback and adjustments 942 may adjust the frequencies, interval durations, etc. that the observation module 920 uses to observe the behavioral information on the IoT device 900, specify one or more features or behaviors to observe (or not observe), etc. In that sense, the observation module 920 may generate the action logs 922 in a periodic manner and/or in response to certain triggering criteria, and the action logs 922 and the behavior vectors 932 may likewise be periodically aggregated and analyzed at the behavior vector extraction module 930 and the analysis module 940, respectively.

Figure 10:
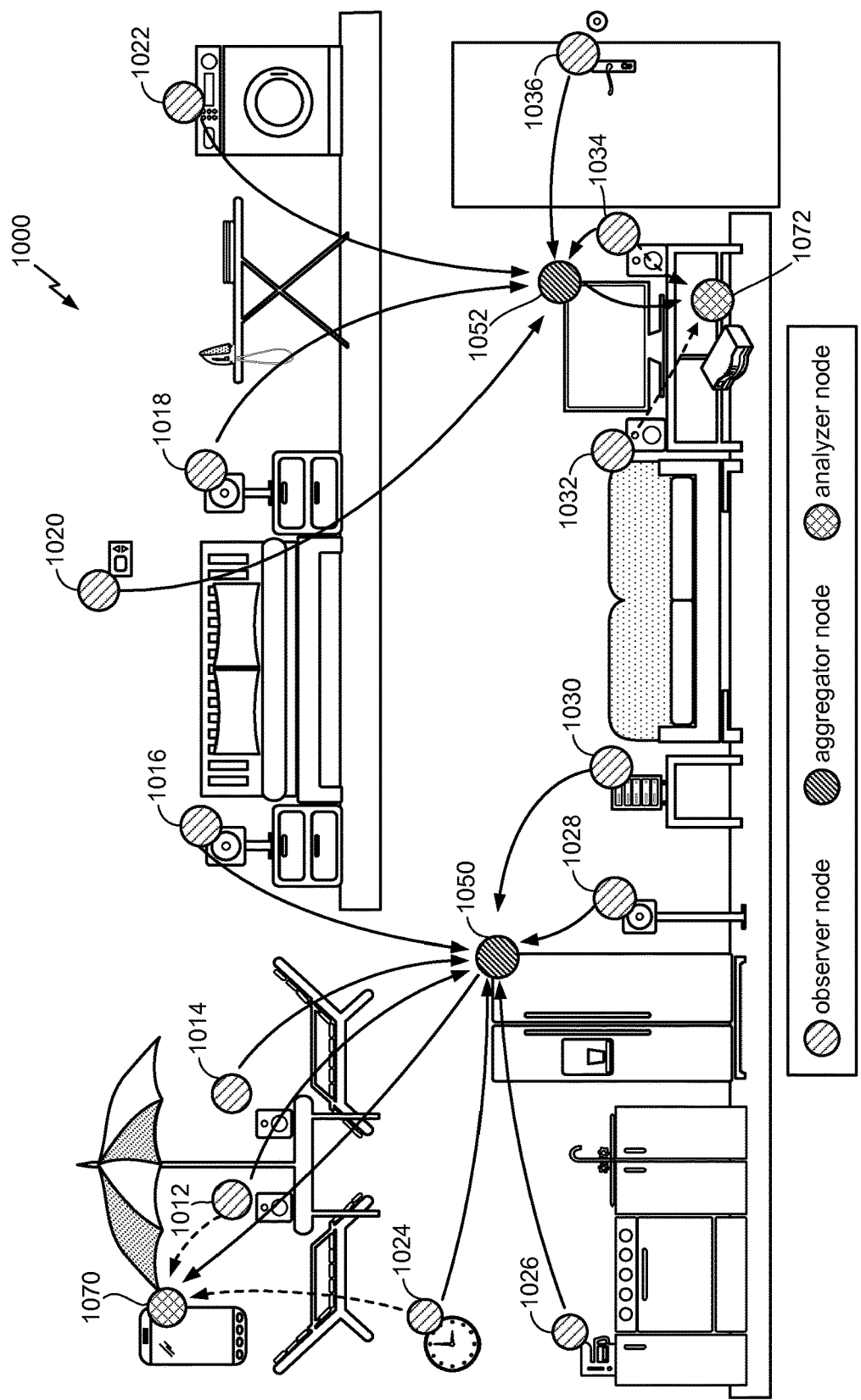
FIG. 10 illustrates an exemplary local IoT environment in which various nodes may communicate to support direct and/or indirect behavioral analysis and automated device health monitoring in the local IoT environment, according to various aspects.

According to various aspects, FIG. 10 illustrates an exemplary local IoT network 1000 having a distributed architecture in which various nodes may communicate to support direct and/or indirect behavioral analysis and automated device health monitoring in the local IoT network 1000. More particularly, whereas the on-device health monitoring platform 910 shown in FIG. 9 may be utilized on an IoT device with adequate storage resources, processing resources, and/or other capabilities to conduct on-device behavioral analysis, the distributed IoT network 1000 shown in FIG. 10 may comprise various simpler devices that may have the capability to observe local behavior and communicate over a network to send the locally observed behaviors to more powerful devices that can then conduct behavioral analysis based on the behaviors observed across the distributed IoT network 1000. In general, the communication among the various nodes in the distributed IoT network 1000 may occur according to a communication framework that can enable direct device-to-device (D2D) communication among heterogeneous devices, as described in further detail above with respect to FIGS. 5-8.

Accordingly, in various embodiments, the various devices in the distributed IoT network 1000 may include one or more legacy devices (e.g., lightbulbs), one or more IoT devices with limited capabilities (e.g., a new refrigerator), and one or more IoT devices with sufficient storage and processing capabilities to conduct the behavioral analysis across the distributed IoT network 1000. As such, the devices in the distributed IoT network 1000 may generally be divided into classes and operate according to a designated role corresponding to the respective class associated therewith. More particularly, the classes into which the devices in the distributed IoT network 1000 are divided may comprise at least (1) legacy devices that can observe local behavior and send the observed local behavior across the IoT network 1000, where the legacy devices may operate according to an "observer" role, (2) IoT devices that have limited capabilities (i.e., more capabilities than the legacy devices but insufficient capabilities to conduct behavioral analysis), wherein the IoT devices that have limited capabilities may operate according to an "aggregator" role, and (3) IoT devices with sufficient storage and processing capabilities to conduct the behavioral analysis across the distributed IoT network 1000, wherein the IoT devices with sufficient capabilities to conduct the behavioral analysis may operate in an "analyzer" role.

Furthermore, in certain embodiments, one or more devices in the distributed IoT network 1000 may have limited peer-to-peer communication capabilities, which may include devices that only support communication over Bluetooth, near-field communication, low-power radio frequency, or other protocols with a limited range such that those devices cannot send the observed local behavior across the IoT network 1000. As such, where the distributed IoT network 1000 includes one or more devices with such limited communication capabilities, the devices configured to operate in the observer, aggregator, and/or analyzer roles may collect any relevant behavioral information from such devices when passing within the limited communication range associated therewith (e.g., for efficiency purposes where the behavioral information collected from such devices does not necessarily require real-time action). Further still, in various embodiments, the IoT network 1000 may comprise one or more network monitoring devices that can observe behaviors associated with the devices in the IoT network 1000 through messages that the devices transmit over the network (e.g., via network snooping or packet sniffing).

Accordingly, in the distributed IoT network 1000 shown in FIG. 10, the devices configured to operate in the observer role comprise outdoor speakers 1012, 1014, indoor speakers 1016, 1018, a thermostat 1020, a laundry machine 1022, a clock 1024, a coffee maker 1026, a living room floor speaker 1028, a bookshelf audio system 1030, home theater speakers 1032, 1034, and a doorknob 1036, collectively referred to herein as observer nodes 1012-1036. Furthermore, the devices configured to operate in the aggregator role comprise a refrigerator 1050 and a television 1052, collectively referred to herein as aggregator nodes 1050-1052, and the devices configured to operate in the analyzer role comprise a smartphone 1070 and a wireless router or home gateway 1072, collectively referred to herein as analyzer nodes 1070-1072. In various embodiments, in the context associated with the on-device health monitoring platform 910 shown in FIG. 9, the observer nodes 1012-1036 may generally perform similar functionality to the observer module 920, whereby the observer nodes 1012-1036 may monitor or otherwise collect local behavioral information and generate one or more action logs that comprise one or more features describing the observed behavior. Furthermore, the aggregator nodes 1050-1052 and the analyzer nodes 1070-1072 may similarly observe local behavior and generate one or more action logs that comprise features describing the observed behavior. For example, exemplary features that may be contained in the action logs generated at a toaster, a smoke detector, a refrigerator, and a television are shown in the following table:

TABLE 2

Example IoT Device Features

| IoT Device | Example Features |
|---|---|
| Toaster | toaster_on |
| | temperature |
| | power_consumption |
| | settings |
| | item_weight |
| | weight_zero_when_toaster_ON |
| | temperature_above_threshold |
| | toaster_ON_temperature_change_zero |
| Smoke Detector | smoke_sensor |
| | battery_level |
| | test_signal |
| Refrigerator | power_consumption |
| | load_level |
| | temperature |
| | settings |
| Television | power_consumption |
| | temperature |
| | internet_connectivity |
| | settings_resolution |
| | settings_brightness |
| | input_devices |
| | content_type |
| | parental_control (ON/OFF) |

In various embodiments, the observer nodes 1012-1036 may then transmit the action logs generated locally to the closest aggregator node 1050-1052, or the observer nodes 1012-1036 may alternatively transmit the action logs to the closest analyzer node 1070-1072 (e.g., to prevent overloading the aggregator nodes 1050-1052, where the observer node 1012-1036 is closer to an analyzer node 1070-1072 than an aggregator node 1050-1052, etc.). Furthermore, the aggregator nodes 1050-1052 may periodically relay the action logs received from any observer nodes 1012-1036 to the closest analyzer node 1070-1072, which may then perform behavioral analysis across the IoT network 1000 based on the action logs. In that sense, the analyzer nodes 1070-1072 may perform similar functionality to the behavior vector extraction module 930 and the analysis module 940 shown in FIG. 9, wherein the analyzer nodes 1070-1072 may map the features contained in the action logs received from the aggregator nodes 1050-1052 (and/or any observer nodes 1012-1036 from which action logs were received) into an n-dimensional space to extract behavior vectors from the behaviors observed in the IoT network 1000. Accordingly, the behavior vectors may combine the features (or behaviors) observed in the IoT network 1000, where each value in the behavior vectors represents the value associated with one observed feature (or behavior). For example, the behavior vectors are generated at a router or other suitable analyzer node 1070-1072, wherein an example behavior vector that combines features observed at a toaster (TS) and a smart power plug (SP) may have the following form:

TABLE 3

Example Behavior Vector

| Feature | TS_ON | TS_temp | TS_weight | TS_max_temp | SP_ON | SP_power_drawn |
|---|---|---|---|---|---|---|
| Value | 1 | 78 | 0.1 | 90 | 1 | 0.7 |

Accordingly, in various embodiments, the behavior vectors extracted at the analyzer nodes 1070-1072 may include different feature sets exhibiting different observation granularities, which the analyzer nodes 1070-1072 may aggregate and analyze to detect one or more behavioral anomalies that could indicate potential malicious attacks against the IoT network 1000 or devices in the IoT network 1000, malfunction or burn-out at one or more devices in the IoT network 1000, or other anomalies that may require further investigation, customer service, and/or remediation. For example, in various embodiments, the analyzer nodes 1070-1072 may analyze the aggregated behavior vectors according to comparisons with models specific to makes, versions, etc. associated with the devices that correspond to the observed behaviors, which may be obtained from manufacturers or other suitable repositories, based on behavior vectors from all devices in the IoT network 1000 and a model specific to the IoT network 1000 and/or inputs and interactions from users associated with the IoT network 1000, etc. Accordingly, rather than detecting the behavioral anomalies based on any one feature alone, the analyzer nodes 1070-1072 may use machine learning to detect the behavioral anomalies through evaluating the behavior vectors in combination against models that are built over time to indicate normal behavior, overall environment states, etc.

Accordingly, in various embodiments, the IoT network 1000 may have different configurations to support the direct and indirect behavioral analysis depending on the capabilities associated with the various devices contained therein. For example, in one hypothetical scenario, all devices in the IoT network 1000 may have sufficient capabilities to conduct on-device behavioral analysis (e.g., as in FIG. 9), in which case each device may operate in the analyzer role and simply report desired information appropriate to building and maintaining the models used to detect the anomalous behaviors. In another scenario, the IoT network 1000 may include some devices that have sufficient capabilities to conduct on-device behavioral analysis and others that cannot, in which case each device that has sufficient capabilities to conduct on-device behavioral analysis may operate in the analyzer role, gather as much information as possible from the other devices (e.g., through D2D communication with the aggregator nodes 1050-1052 and/or observer nodes 1012-1036, monitored network messages, etc.), and gather any other extra information from neighboring devices operating in the analyzer role. In still another scenario, where the IoT network 1000 only includes one device that has sufficient capabilities to conduct on-device behavioral analysis (e.g., the smartphone 1070), that device may gather any available information through wireless communication with the observer nodes 1012-1036, the aggregator nodes 1050-1052, any network monitoring agent, etc. and conduct the behavioral analysis based thereon (e.g., to monitor device liveliness). For example, the smartphone 1070, the home gateway 1072, or another singular device that can operate in the analyzer role may comprise appropriate hardware and software that can gather any available information about the IoT network 1000 (e.g., temperature, light, movement, etc.), monitor the IoT network 1000 based on the available information that could be gathered, and ensure that measurements obtained about the local environment are consistent with any information that could be gathered via the wireless communication with the observer nodes 1012-1036, aggregator nodes 1050-1052, network monitoring agent, etc.

Figure 11:
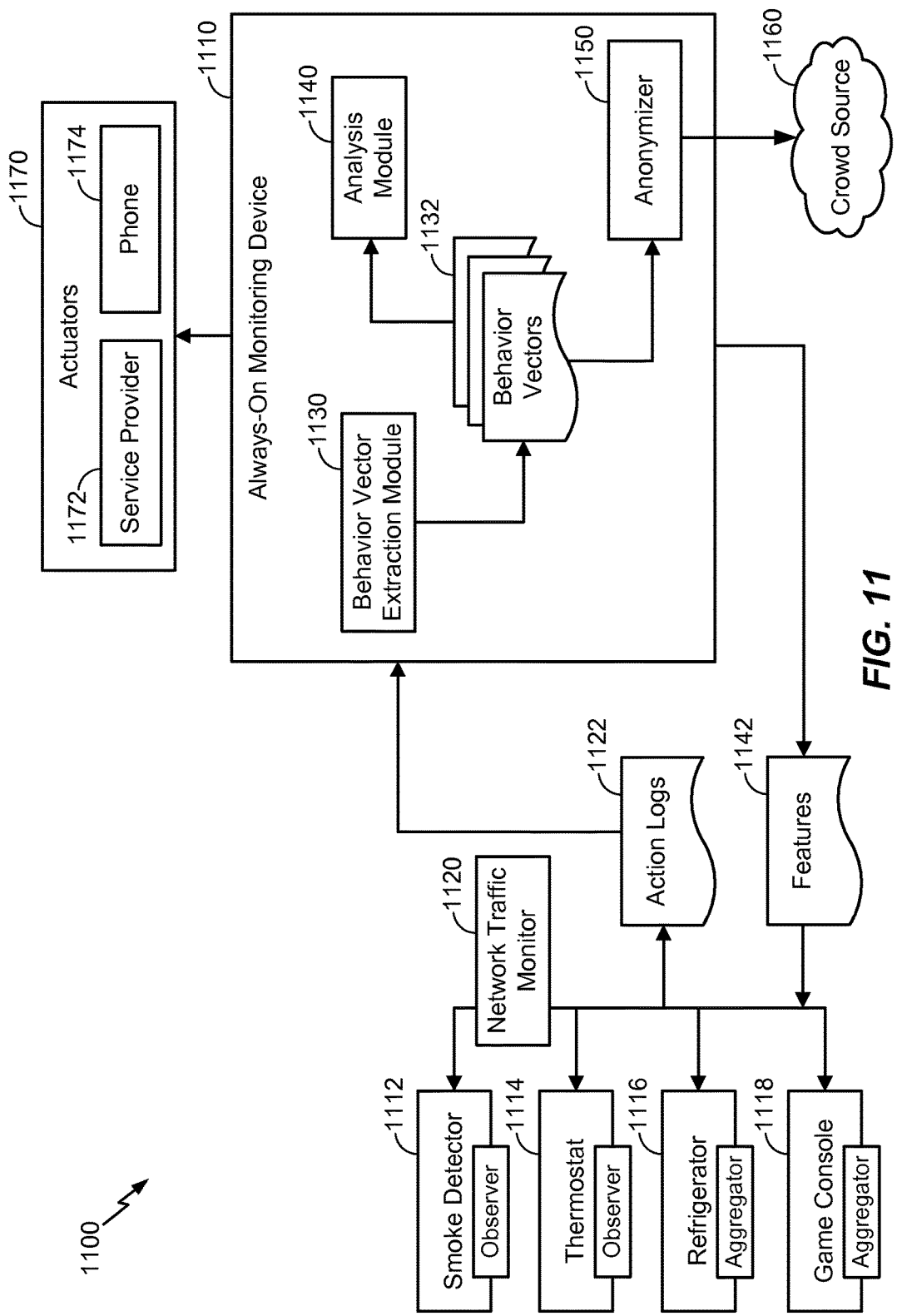
FIG. 11 illustrates an exemplary distributed architecture in which various nodes may communicate to support direct and/or indirect behavioral analysis and automated device health monitoring in a local IoT environment, according to various aspects.

According to various aspects, referring to FIG. 11, another exemplary distributed architecture 1100 is illustrated therein, wherein the distributed architecture 1100 shown in FIG. 11 may comprise a local IoT environment in which various nodes may communicate with one another to support direct and/or indirect behavioral analysis and automated device health monitoring. In general, the distributed architecture 1100 shown in FIG. 11 may include various components and functionalities that are the same and/or substantially similar to the distributed IoT network 1000 shown in FIG. 10, and as such, various details relating to certain components in the distributed architecture 1100 may be omitted herein to the extent that the relevant details have already been provided above for brevity and ease of description. For example, in FIG. 11, the distributed architecture 1100 may include a smoke detector 1112 and a thermostat 1114 that may operate in the observer role described above, a refrigerator 1116 and a game console 1118 that may operate in the aggregator role described above, an always-on monitoring device 1110 that may operate in the analyzer role described above, and a network traffic monitor 1120 that may observe behaviors associated with the smoke detector 1112, the thermostat 1114, the refrigerator 1116, the game console 1118, and one or more other devices through messages that the devices transmit over the network (e.g., via network snooping or packet sniffing).

Accordingly, in the distributed architecture 1100 shown in FIG. 11, the always-on monitoring device 1110 may receive one or more action logs 1122 from the observer devices 1112, 1114, the aggregator devices 1116, 1118, and the network traffic monitor 1120, wherein the always-on monitoring device 1110 may comprise a behavior vector extraction module 1130 configured to map the features contained in the action logs 1122 into an n-dimensional space to extract one or more behavior vectors 1132 that represent the observed behaviors. The behavior vectors 1132 generated at the behavior vector extraction module 1130 may then be provided to an analysis module 1140, which may aggregate the behavior vectors 1132 to detect one or more behavioral anomalies that could indicate potential malicious attacks, malfunctions or burn-out at the monitored devices, or other anomalies. For example, in various embodiments, the analysis module 1140 may analyze the aggregated behavior vectors 1132 according to comparisons with models specific to makes, versions, etc. associated with the devices that correspond to the observed behaviors, which may be obtained from manufacturers or other suitable repositories, based on behavior vectors from all devices in the IoT network 1100, a model specific to the IoT network 1100, and/or inputs and interactions from users associated with the IoT network 1100, as described above. Furthermore, in various embodiments, the behavior vectors 1132 may be provided to an anonymizer 1150, which may apply one or more anonymity algorithms to remove personal or sensitive information from the behavior vectors 1132 prior to providing the behavior vectors 1132 to a crowd source 1160. In that sense, the crowd source 1160 may allow the models used to determine normal versus anomalous behavior to be further built or otherwise developed over time based on behavioral analysis that may be conducted in other IoT environments, wherein any information learned through interaction with the crowd source 1150 may be provided to the analysis module 1140 to enhance the models that are developed over time and used to detect the anomalies in the distributed network 1100.

Furthermore, in various embodiments, the analysis module 1140 may invoke one or more actuators 1170 to remediate one or more behavioral anomalies detected in the analyzed behavior vectors 1132. For example, the actuators may comprise one or more service providers 1172, a phone 1174 used to communicate with online support, or other actuators 1170 that can provide online troubleshooting, on-device or in-home diagnostics, or other techniques to assist with remediating one or more behavioral anomalies detected from the analyzed behavior vectors 1132. For example, in one embodiment, the analysis module 1140 may invoke a request/response system to enable back and forth messaging between with the actuators 1170 such that more information can be gathered (e.g., the analysis module 1140 may act as a router between the local distributed architecture 1100 and the external actuators 1170). Moreover, based on the analyzed behavior vectors 1132, the analysis module 1140 may provide observation feedback and adjustment features 1142 to configure the observer devices 1112, 1114, the aggregator devices 1116, 1118, and the network traffic monitor 1120. For example, the observation feedback and adjustment features 1142 may adjust the frequencies, interval durations, etc. that the observer devices 1112, 1114, the aggregator devices 1116, 1118, and the network traffic monitor 1120 use to observe the behavioral information, specify particular features or behaviors to observe (or not observe), etc. In that sense, the observer devices 1112, 1114, the aggregator devices 1116, 1118, and the network traffic monitor 1120 may generate the action logs 1122 in a periodic manner and/or in response to certain triggering criteria according to the feedback features 1142, and the action logs 1122 may likewise be periodically aggregated and analyzed at the always-on monitoring device 1110.

Figure 12:
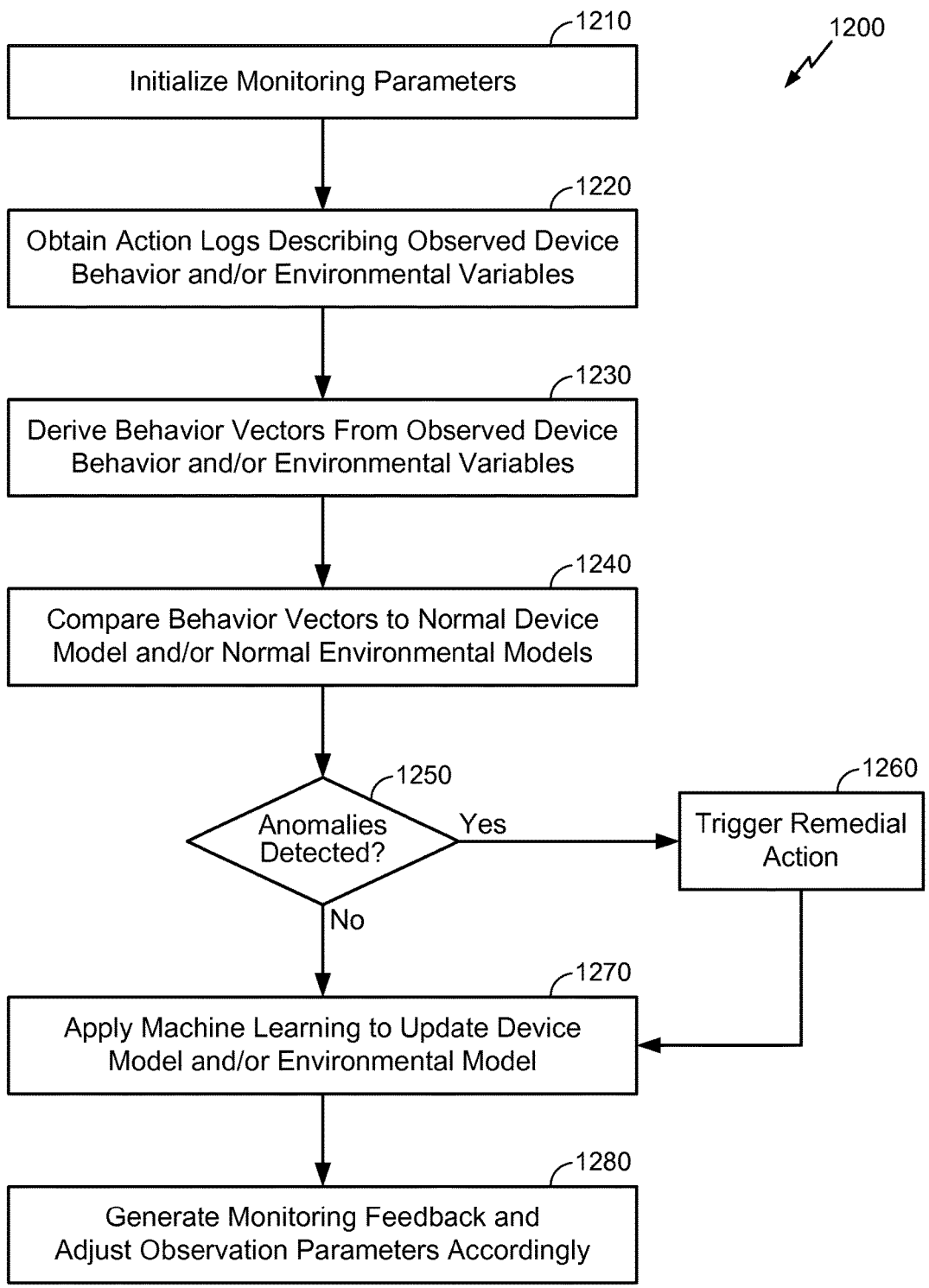
FIG. 12 illustrates an exemplary method to conduct behavioral analysis that can support automated device health monitoring, according to various aspects.

According to various aspects, FIG. 12 illustrates an exemplary method 1200 to conduct behavioral analysis that can support automated device health monitoring. In particular, various monitoring parameters may be initialized at block 1210, which may comprise establishing and/or adjusting one or more frequencies according to which behaviors are observed, defining certain features to observe, etc. Furthermore, in a distributed architecture, initializing the monitoring parameters may comprise designating one or more observer nodes, aggregator nodes, and analyzer nodes that are configured to perform certain functions to assist with the behavioral analysis that may be conducted across the distributed architecture. In various embodiments, at block 1220, one or more action logs that contain one or more features describing observed behaviors and/or environmental behaviors may be obtained, either at an IoT device that performs local (on-device) health monitoring or from one or more observer and/or aggregator nodes in a distributed architecture. For example, in a distributed architecture, the observer nodes may then transmit locally generated action logs to the closest aggregator node, or the observer nodes may alternatively transmit the action logs to the closest analyzer node. Furthermore, the aggregator nodes may periodically relay the action logs received from any observer nodes to the closest analyzer node. Accordingly, at block 1230, the features contained in the action logs may be mapped into an n-dimensional space to extract one or more behavior vectors from the observed behaviors and/or environmental variables in the IoT network. The behavior vectors may then be compared with models specific to certain device makes, versions, etc. at block 1240, wherein the models may be obtained from manufacturers or other suitable repositories, based on behavior vectors from all devices in the IoT network and a model specific to the IoT network, inputs and interactions from users associated with the IoT network, etc.

In various embodiments, at block 1250, the comparison between the behavior vectors and the normal device model and/or the normal environmental model may be evaluated to determine whether one or more anomalies were detected. In response to determining that the behavior vectors represent one or more anomalies, appropriate remedial action(s) may be triggered at block 1260. For example, in various embodiments, the remedial action(s) triggered at block 1260 may comprise invoking one or more actuators to remediate any behavioral anomalies detected in the analyzed behavior vectors, wherein the actuators may comprise one or more service providers, a phone used to communicate with online support, or other actuators that can provide online troubleshooting, on-device or in-home diagnostics, or other techniques to assist with remediating one or more behavioral anomalies detected from the analyzed behavior vectors (e.g., a request/response system may be invoked to enable back and forth messaging between with the actuators such that more information can be gathered).

In various embodiments, at block 1270, machine learning may be applied to update the device model and/or environmental models used to conduct the behavioral analysis. For example, in various embodiments, block 1270 may comprise updating models specific to certain device makes, versions, etc., updating models associated with the overall IoT network, updating appropriate models according to inputs and interactions from users associated with the IoT network, providing the behavior vectors to a crowd source to allow the models used to determine normal versus anomalous behavior to be further built or otherwise developed over time based on behavioral analysis that may be conducted in other IoT environments, and so on. Accordingly, rather than detecting the behavioral anomalies based on any one feature alone, the machine learning applied at block 1270 may ensure that the models used to detect the behavioral anomalies include contextually relevant information built over time to indicate normal behavior, overall environment states, etc.

Moreover, at block 1280, observation feedback and adjustment features to configure subsequent monitoring and observation parameters may be generated. For example, the monitoring feedback and observation parameter adjustments may tune the frequencies, interval durations, etc. used to observe and collect the behavioral information, specify particular features or behaviors to observe (or not observe), etc. In that sense, the monitoring feedback and observation parameter adjustments may result in the action logs being generated in a periodic manner and/or in response to certain triggering criteria according to the feedback features, and the action logs may also be periodically aggregated and analyzed according to the monitoring feedback and adjusted observation parameters.

Figure 13:
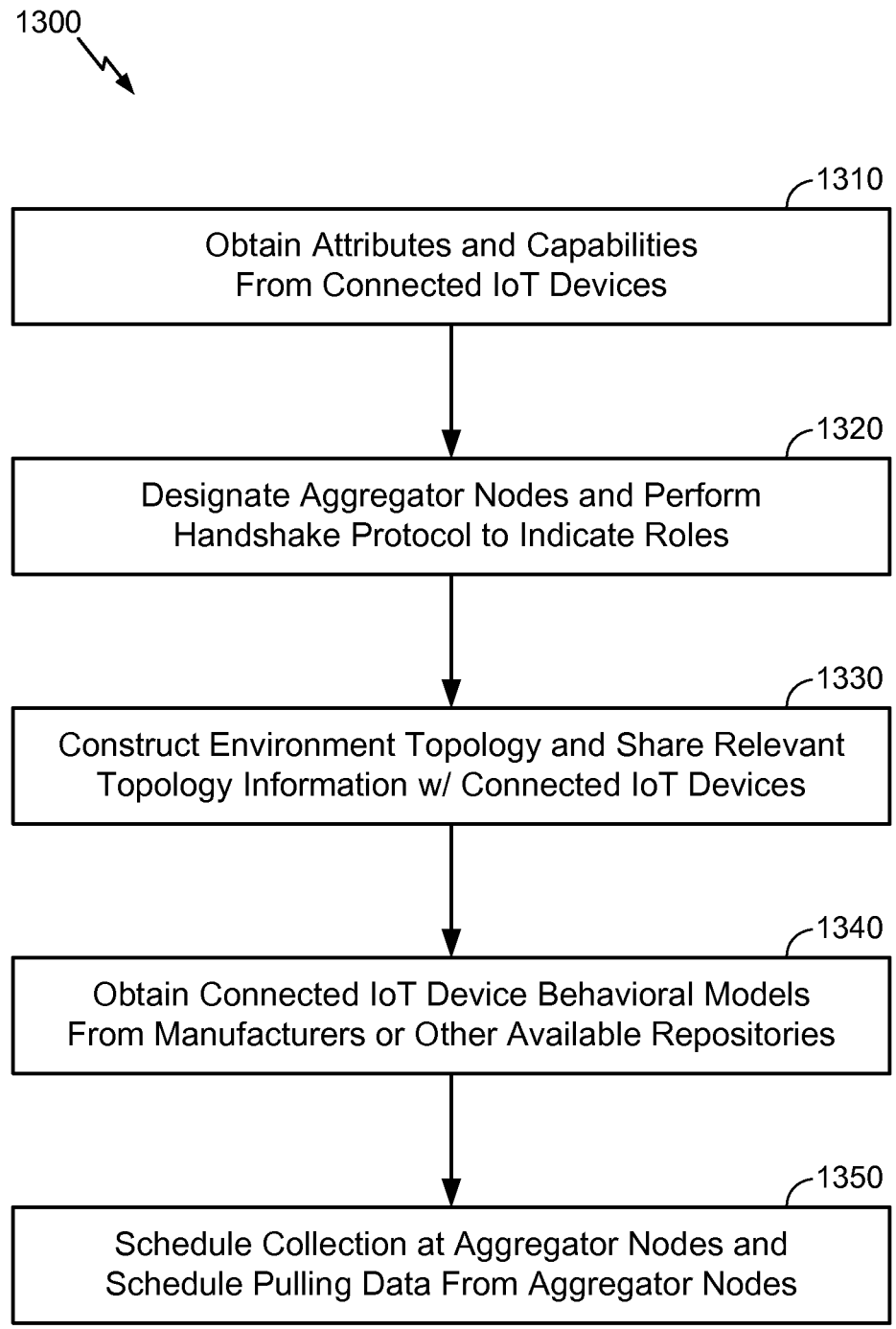
FIG. 13 illustrates an exemplary method to initialize behavioral analysis that can be conducted to support automated device health monitoring, according to various aspects.

According to various aspects, FIG. 13 illustrates an exemplary method 1300 to initialize behavioral analysis that can be conducted to support automated device health monitoring, wherein the method 1300 shown in FIG. 13 may generally be applied in a distributed health monitoring architecture (e.g., as in FIGS. 10 and 11). However, those skilled in the art will appreciate that a similar initialization method may be performed in a standalone (on-device) health monitoring context (e.g., as in FIG. 9), except that in such implementations certain features may be omitted and/or appropriately modified. For example, in a standalone (on-device) health monitoring context, a need to obtain attributes and capabilities from connected IoT devices and designate aggregator and analyzer roles may not be necessary, whereby such initialization steps described below may be omitted.

In various embodiments, at block 1310, initializing the behavioral analysis that can be conducted to support automated device health monitoring may comprise obtaining attributes and capabilities from connected IoT devices (e.g., attributes and capabilities that relate to networking, power, processor, functionality, etc.). In various embodiments, at block 1320, aggregator nodes may be designated and a handshake protocol may be performed to indicate and acknowledge the designated roles. For example, the ability to serve in the aggregator role may depend on the designated devices having sufficient network capabilities (e.g., supported network types, bandwidth, range, etc.), power, and processing capabilities, which may be determined based on the attributes and capabilities obtained at block 1310. In various embodiments, at block 1330, an environment topology may be constructed and relevant topology information may be shared with the connected IoT devices, and behavioral models associated with the connected IoT devices may be obtained from manufacturers associated therewith and/or other suitable repositories at block 1340. In various embodiments, at block 1350, data collection may be scheduled at the aggregator nodes and pulling data from the aggregator nodes may also be scheduled, at which point the system may be ready to conduct behavioral analysis as described above.

Figure 14:
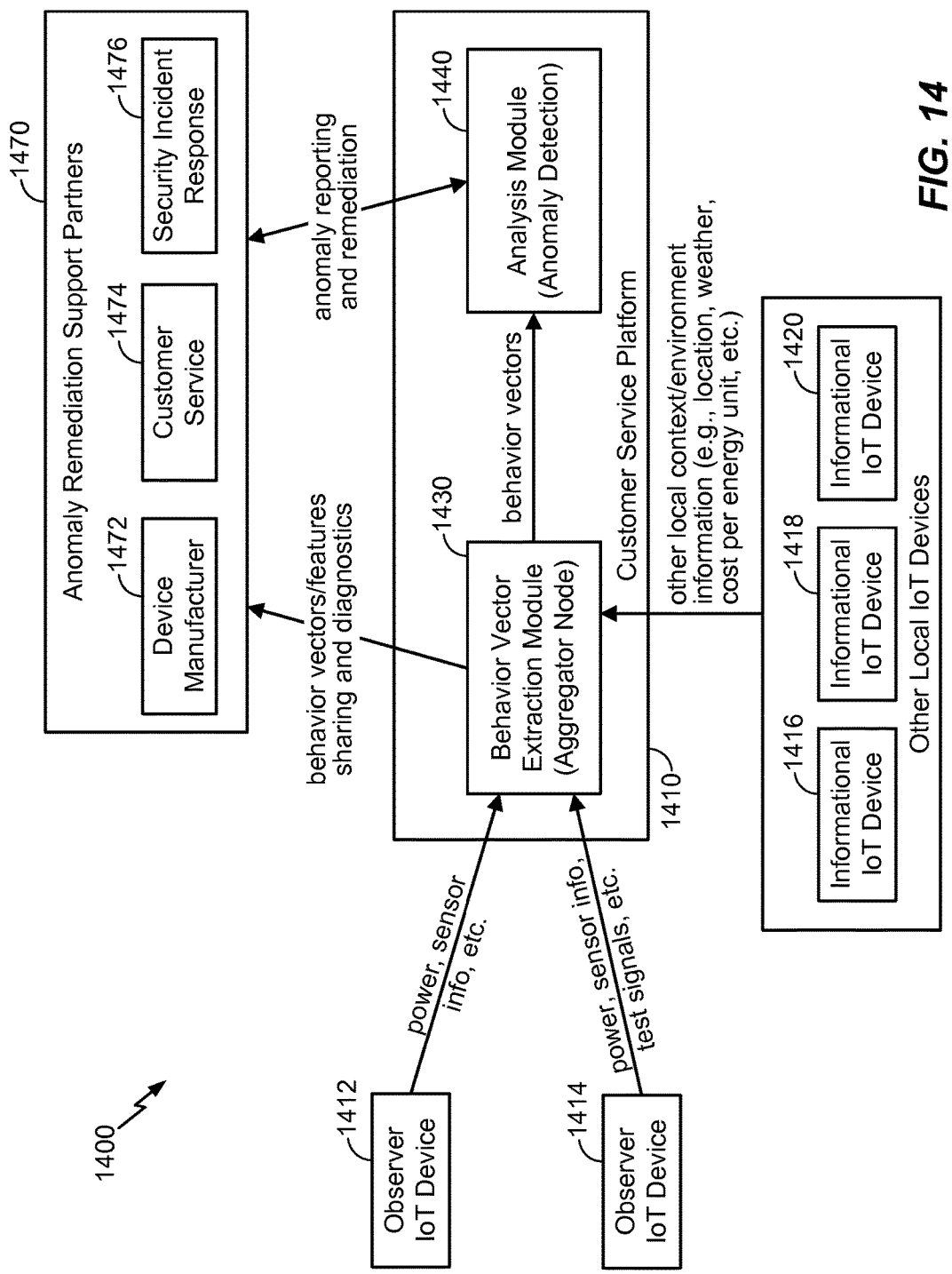
FIG. 14 illustrates an exemplary distributed architecture in which direct and/or indirect behavioral analysis performed in a local IoT environment can be used to detect and remediate anomalous behavior, according to various aspects.

According to various aspects, FIG. 14 illustrates an exemplary distributed architecture 1400 in which direct and/or indirect behavioral analysis performed in a local IoT environment can be used to detect and remediate anomalous behavior. In general, the distributed architecture 1400 shown in FIG. 14 may include various components and functionalities that are the same and/or substantially similar to the distributed IoT networks 1000, 1100 shown in FIG. 10 and FIG. 11, respectively, and as such, various details relating to certain components in the distributed architecture 1400 may be omitted herein to the extent that the relevant details have already been provided above for brevity and ease of description. For example, in FIG. 14, the distributed architecture 1400 may include a first observer IoT device 1412 that may provide one or more action logs including features to describe observed power behaviors, sensor information, etc. to a customer service platform 1410 in addition to a second observer IoT device 1414 that may provide one or more action logs including features to describe one or more test signals in addition to observed power behaviors, sensor information, etc. to the customer service platform 1410. Furthermore, in FIG. 14, the distributed architecture 1400 may include other local IoT devices, which may generally comprise informational IoT devices 1416, 1418, 1420 that may provide other local context information and/or environmental information to the customer service platform 1410 (e.g., location information, weather, cost per energy unit, etc.).

Accordingly, in the distributed architecture 1400 shown in FIG. 14, the customer service platform 1410 may receive one or more action logs from the observer IoT devices 1412, 1414 in addition to relevant local context and/or environment information from the informational IoT devices 1416, 1418, 1420, which may combined at a behavior vector extraction module 1430 (or aggregator node) configured to map the features contained in the action logs and the relevant local context and/or environment information into an n-dimensional space to extract one or more behavior vectors. The behavior vectors may then be provided to one or more anomaly remediation support partners 1470 and to an analysis module 1440, wherein the analysis module 1440 may aggregate the behavior vectors to detect one or more behavioral anomalies that could indicate potential malicious attacks, malfunctions or burn-out at the monitored devices, or other anomalies. For example, in various embodiments, the analysis module 1440 may analyze the aggregated behavior vectors according to comparisons with models specific to makes, versions, etc. associated with the devices that correspond to the observed behaviors, which may be obtained from manufacturers 1472 or other suitable repositories, based on behavior vectors from all devices in the IoT network 1400, a model specific to the IoT network 1400, and/or inputs and interactions from users associated with the IoT network 1400.

Furthermore, in the customer service use case shown in FIG. 14, the behavior vectors may be compared against one or more thresholds or other suitable parameters to detect the anomalies. In that context, the thresholds or other parameters used to detect the anomalies may be dependent on context, in that the anomaly detection thresholds or other anomaly detection parameters could reflect normal or abnormal conditions in different scenarios. Accordingly, having the location information, weather information, and other relevant local context and/or environment information from the informational IoT devices 1416, 1418, 1420 may be helpful towards determining the thresholds or other parameters used to detect the anomalies. Furthermore, in various embodiments, the anomaly detection thresholds or anomaly detection parameters can be learned over time and customized to specific user requirements or usage patterns on a device-specific basis, which may ensure that no single model is used to detect all anomalies and thereby potentially increase false positive rates and/or false negative rates. For example, consider a use case where groceries and other items are automatically delivered to a home environment. The refrigerator(s) in the home environment could have the capability to scan the items stored inside and order groceries automatically upon depletion. Typically, users may buy standard grocery items that are expected to last a particular (relatively constant) duration (e.g., two gallons of milk, two dozen eggs, etc.), and one component in an energy bill may be a tariff that is expressed in slabs and increases in a non-linear manner. Accordingly, information can be obtained and/or estimated such that recommendations can be made to the user with respect to the grocery items that need to be bought, taking into consideration the current energy cost per unit, how many guests are expected through scanning emails, etc.

Furthermore, in various embodiments, the analysis module 1440 may report one or more detected anomalies to the anomaly remediation support partners 1470 to request assistance with remediating one or more behavioral anomalies detected in the environment 1400. For example, the anomaly remediation support partners 1470 may comprise the device manufacturers 1472, customer service 1474, a security incident response system 1476, or other suitable entities that can assist with remediating the behavioral anomalies detected in the environment 1400. For example, the analysis module 1440 may invoke a request/response system to enable back and forth messaging with the appropriate anomaly remediation support partners 1470 such that more information can be gathered, whereby the analysis module 1440 may act as a router between the local environment 1400 and the external anomaly remediation support partners 1470.

Figure 15:
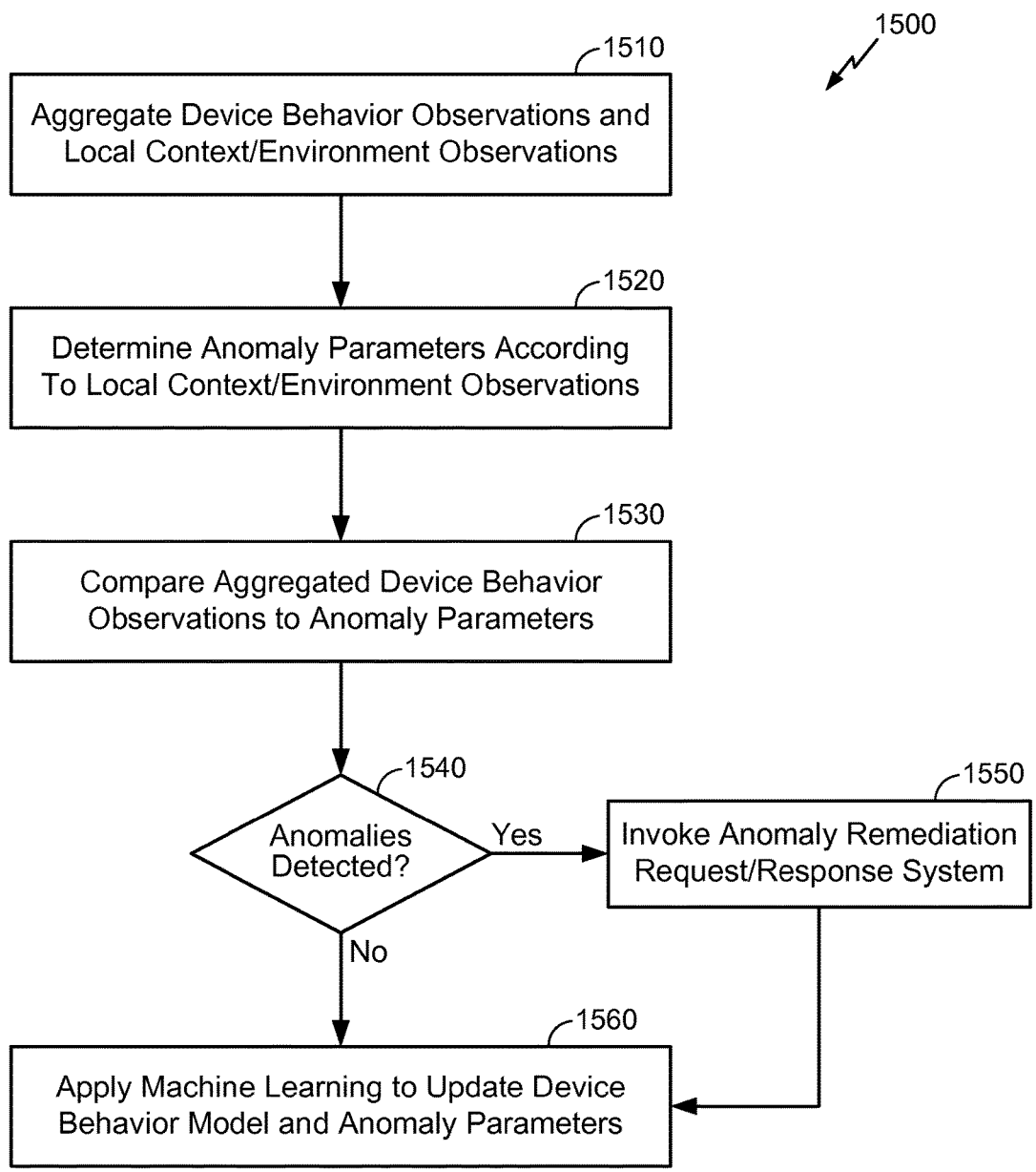
FIG. 15 illustrates an exemplary method for conducting direct and/or indirect behavioral analysis in a local IoT environment to automate customer service and security incident responses to remediate anomalous behavior, according to various aspects.

According to various aspects, FIG. 15 illustrates an exemplary method for conducting direct and/or indirect behavioral analysis in a local IoT environment to automate customer service and security incident responses to remediate anomalous behavior. More particularly, at block 1510, one or more actions logs that describe behavior observed at one or more devices in the IoT environment may be aggregated along with local contextual information, environmental information, and/or other suitable information that may be relevant to modeling the overall state associated with the local IoT environment, wherein the local contextual information, the environmental information, etc. aggregated at block 1510 may be received from one or more informational IoT devices (e.g., weather sensors, energy meters, etc.). Furthermore, those skilled in the art will appreciate that the device behavior observations and the local contextual information, environmental information, etc. may be aggregated at a customer service platform (e.g., as shown in FIG. 14), which may reside on a particular IoT device designated to operate as an analyzer node that conducts behavioral analysis across the IoT environment, at a particular IoT device that may use an on-device customer service platform to conduct customer service behavioral analysis at a local level using locally observed behaviors in combination with the local contextual information, the environmental information, etc. aggregated from the informational IoT devices. As such, the method 1500 shown in FIG. 15 and described herein may generally be performed in a distributed architecture (e.g., across the local IoT environment), in a stand-alone or centralized architecture (e.g., at a particular IoT device having sufficient processing capabilities to conduct behavioral analysis using an on-device customer service/health monitoring platform), and/or various combinations thereof.

In various embodiments, at block 1520, one or more anomaly detection parameters may be determined, wherein the one or more anomaly detection parameters may vary from one use case to another depending on context (e.g., as described in further detail below with respect to FIG. 15 and FIG. 16). For example, in various embodiments, the anomaly detection parameters that are determined at block 1520 may reflect normal conditions, abnormal conditions, or other suitable conditions in different scenarios and/or contexts. Accordingly, in various embodiments, the local contextual and/or environmental information aggregated at block 1510 may be used in combination with other relevant information to determine the anomaly detection parameters (e.g., the other relevant information may include prior behaviors observed at a particular IoT device in a use case where the anomaly detection parameters are compared to current behavior observed at that IoT device). Furthermore, in various embodiments, the anomaly detection parameters that are determined at block 1520 can be learned over time and customized to specific user requirements or usage patterns on a device-specific basis, which may reduce false positive and/or false negative rates because no single model is used to detect all anomalies.

In various embodiments, at block 1530, the aggregated device behavior observations may be compared to the anomaly parameters to determine whether the aggregated device behavior observations indicate one or more potential anomalies. For example, in various embodiments, the aggregated device behavior observations and any other relevant contextual information may be mapped into an n-dimensional space to extract one or more behavior vectors, which may be compared to the anomaly detection parameters to determine whether the behavior observations potentially reflect a malicious attack, malfunction, burn-out, or another anomaly at the monitored device(s). Accordingly, in response to determining at block 1540 that the behavior observations indicate one or more potential anomalies, an anomaly remediation request and response system may be invoked at block 1550. For example, the anomaly remediation request and response system may be invoked to report the anomalies detected at block 1540 to one or more support partners that can provide assistance with respect to remediating the behavioral anomalies detected at block 1540. As such, the request and response system may be invoked at block 1550 to enable back and forth messaging with the appropriate support partners such that more information can be gathered and the anomalous behavior can be diagnosed and resolved through appropriate troubleshooting procedures.

In various embodiments, at block 1560, machine learning may be applied to update one or more device models, environment models, anomaly parameters, etc. used to conduct the automated customer service and security incident response methodology. For example, in various embodiments, block 1560 may comprise updating models specific to certain device makes, versions, etc., updating models associated with the overall IoT environment, updating appropriate models according to inputs and interactions from users associated with the IoT network, providing the behavior observations to a crowd source to further build or otherwise develop the models based on behavioral analysis conducted in other IoT environments, updating the anomaly parameters to reflect behavior patterns that are observed over time, and so on. Accordingly, rather than detecting the behavioral anomalies based on any one feature (or behavior) alone, the machine learning applied at block 1560 may ensure that the models used to detect the behavioral anomalies include contextually relevant information built over time to indicate normal behavior, overall environment states, etc.

Figure 16:
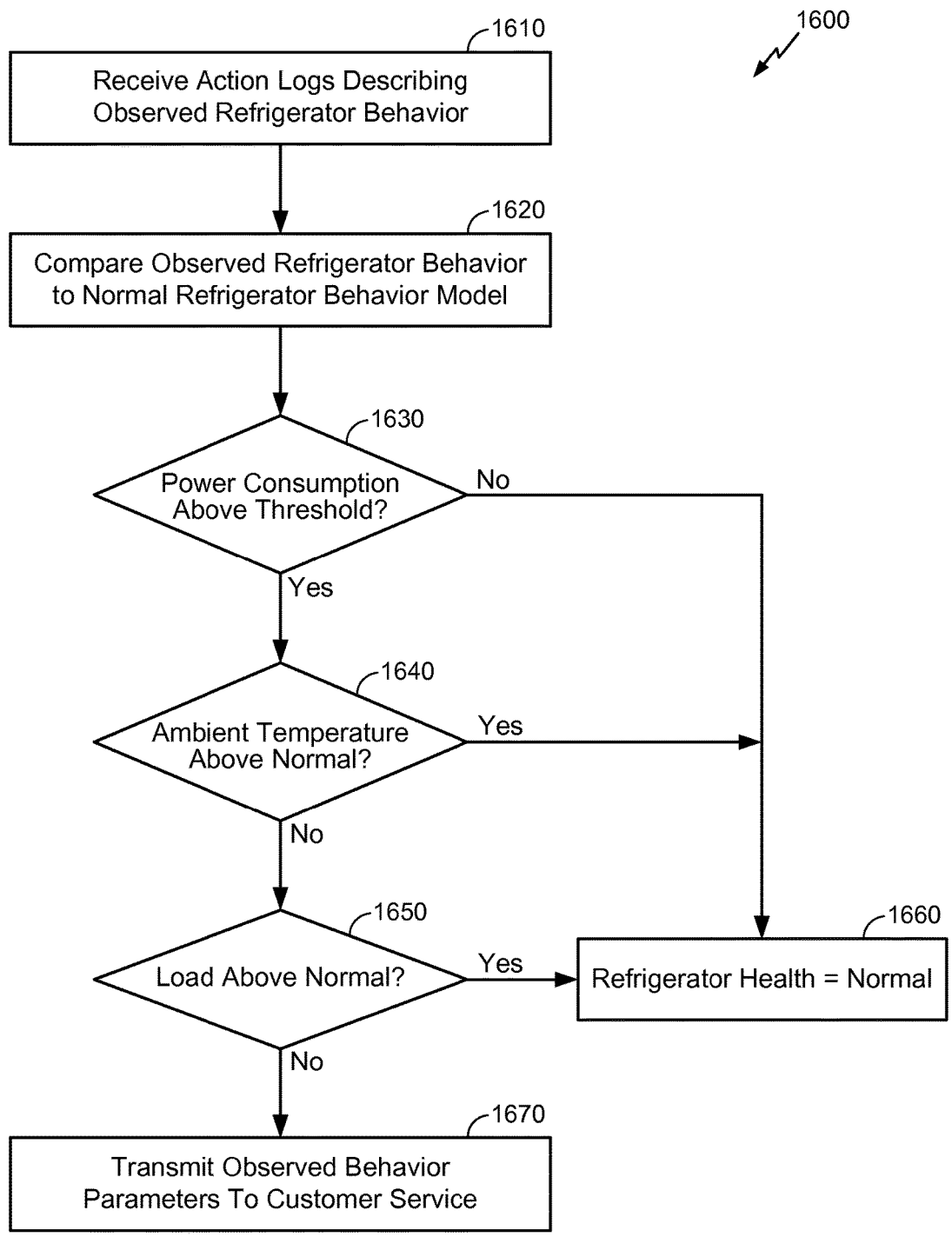
FIG. 16 illustrates a method corresponding to an exemplary customer service use case in which direct and/or indirect behavioral analysis may be conducted to monitor the health associated with a refrigerator IoT device, according to various aspects.

According to various aspects, FIG. 16 illustrates a method 1600 corresponding to an exemplary customer service use case in which direct and/or indirect behavioral analysis may be conducted to monitor the health associated with a refrigerator IoT device. More particularly, in various embodiments, the refrigerator IoT device may observe local behaviors and generate one or more action logs describing the observed behavior at the refrigerator IoT device, wherein the action logs describing the observed behavior associated with the refrigerator IoT device may be received at a customer service platform at block 1610. For example, in various embodiments, the customer service platform can reside on the refrigerator IoT device where the refrigerator IoT device has sufficient capabilities (e.g., storage resources, processor resources, network resources, etc.), or the customer service platform can alternatively reside on a remote device such as a smart phone, an always-on router, or another suitable device that has sufficient processing capabilities to conduct behavioral analysis. In any case, at block 1620, the behavior observed at the refrigerator IoT device may then be compared to one or more models that represent normal behavior associated with the refrigerator IoT device and define one or more normal and/or abnormal threshold values that can be used to detect anomalous behavior. For example, in various embodiments, the one or more models may include information that indicates a normal (or abnormal) power consumption, ambient temperature, load, and/or other suitable state associated with the refrigerator IoT device. Accordingly, because the threshold values that are monitored to detect the anomalies can be normal or abnormal depending on context, the comparisons performed at block 1620 may further use location-specific information (e.g., local weather) to determine the threshold values compared to the behavior observed at the refrigerator IoT device to the extent that such contextual information is available.

Accordingly, in the refrigerator IoT device use case shown in FIG. 16, block 1620 may include comparing the behavior observed at the refrigerator IoT device to one or more models that indicate normal (or abnormal) power consumption, ambient temperature, and load values associated with the refrigerator IoT device. As such, in response to determining at block 1630 that the action logs describing the current behavior observed at the refrigerator IoT device includes a power consumption behavior feature having a value that does not exceed a threshold value (e.g., a power consumption level over which the refrigerator may fail, cause a circuit to overload, etc.), the refrigerator health may be deemed normal at block 1660. In the alternative, in response to determining at block 1630 that the value associated with the power consumption behavior feature exceeds the threshold value, one or more further behavior features may be checked to determine whether the power consumption indicates a potential anomaly that may require customer service or a normal condition under the circumstances For example, an ambient temperature observed at the refrigerator IoT device may be compared to a normal ambient temperature at block 1640, wherein the refrigerator health may be deemed normal at block 1660 in response to the observed ambient temperature exceeding the normal ambient temperature (e.g., because the refrigerator can be expected to draw more power in order to maintain the same internal temperature level when the surrounding environment is warmer than usual). In a similar respect, in the event that the observed ambient temperature does not exceed the normal ambient temperature, block 1650 may comprise comparing an observed load at the refrigerator IoT device (e.g., an amount of food stored in the refrigerator expressed according to weight, volume, etc.) to a normal (or typical) load, wherein the refrigerator health may be deemed normal at block 1660 in response to the observed load exceeding the normal/typical load (e.g., because the refrigerator can be expected to draw more power to cool a large amount of food, even if the ambient temperature is normal or below normal).

However, in response to blocks 1630, 1640, 1650 resulting in respective determinations that the observed power consumption exceeds the threshold value, the observed ambient temperature is normal or below normal, and the observed load is normal or below normal, an anomalous condition may be detected and reported at block 1670, which may comprise transmitting the observed behavior parameters to customer service (e.g., the observed power consumption, the observed ambient temperature, and the observed load) and possibly also the threshold values compared to the observed behavior parameters (e.g., to ensure that appropriate threshold values were used in order to detect a potential false positive). Furthermore, at block 1650, an anomaly remediation request and response system may be invoked to enable back and forth messaging with appropriate support partners such that more information can be gathered and the anomalous behavior can be diagnosed and resolved through appropriate troubleshooting procedures.

Figure 17:
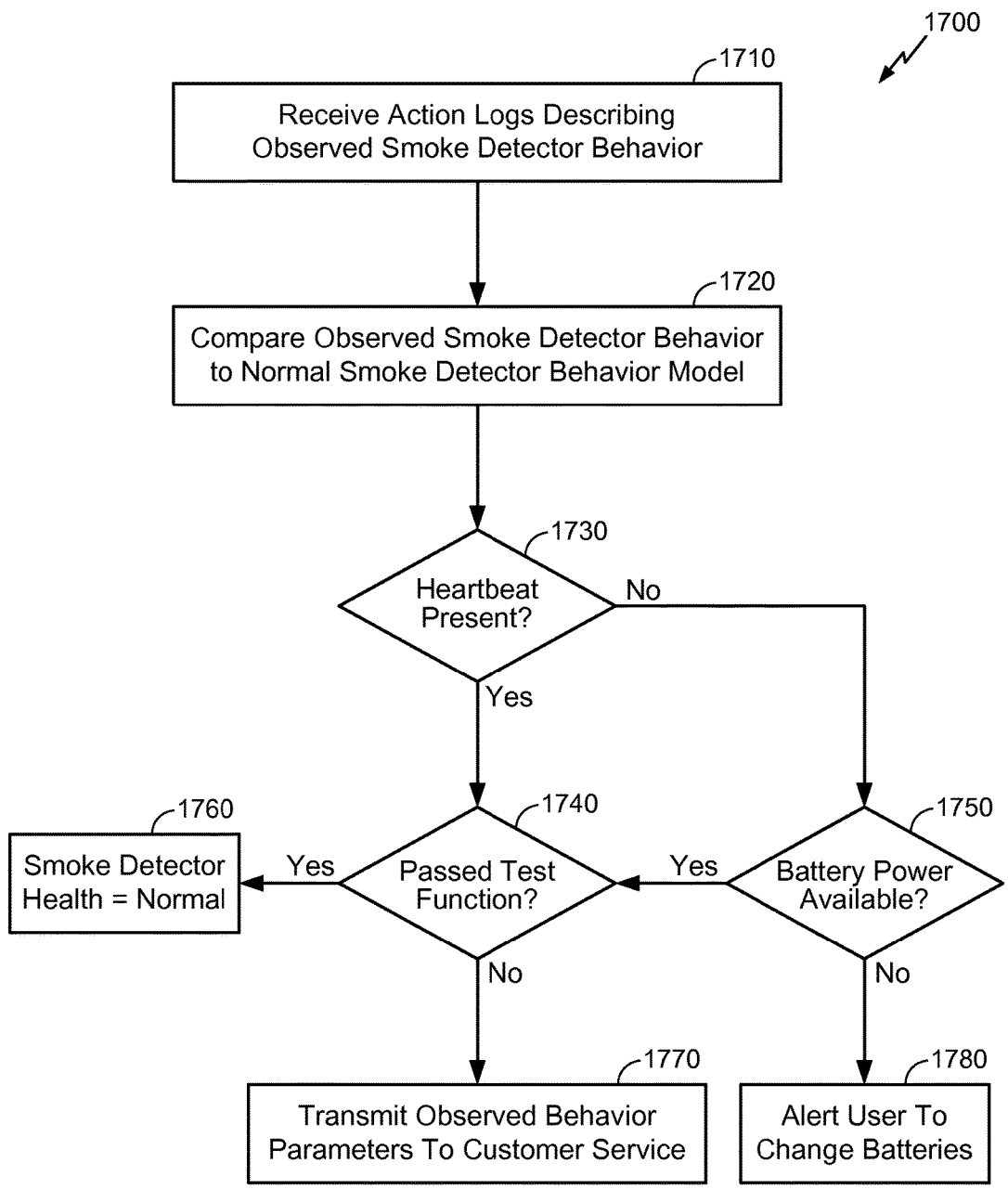
FIG. 17 illustrates a method corresponding to an exemplary customer service use case in which direct and/or indirect behavioral analysis may be conducted to monitor the health associated with a smoke detector IoT device, according to various aspects.

According to various aspects, FIG. 17 illustrates a method 1700 corresponding to an exemplary customer service use case in which direct and/or indirect behavioral analysis may be conducted to monitor the health associated with a smoke detector IoT device. More particularly, in various embodiments, the smoke detector IoT device may observe local behaviors and generate one or more action logs describing the locally observed behavior, wherein block 1710 may comprise receiving the action logs describing the observed behavior at a customer service platform. For example, in various embodiments, the customer service platform can reside on the smoke detector IoT device in the event that the smoke detector IoT device has sufficient processing capabilities, or the customer service platform can reside on a remote device such as a smart phone, an always-on router, or another suitable device that has sufficient processing capabilities to conduct behavioral analysis. In various embodiments, at block 1720, the observed behavior may be compared to one or more models that represent normal behavior associated with the smoke detector IoT device, wherein the models may further define one or more parameters that indicate normal and/or abnormal conditions and can be used to detect anomalous behavior.

Accordingly, in the smoke detector use case shown in FIG. 17, block 1730 may comprise determining whether the observations collected at the smoke detector IoT device indicate that a heartbeat is present, wherein an absent heartbeat may indicate potentially anomalous behavior because the heartbeat represents the most basic parameter of a functioning smoke detector. As such, in response to determining at block 1730 that no heartbeat is present, a further check may be performed at block 1750 to determine whether battery power is available, in which case a user may be alerted to change the batteries at block 1780 (e.g., because the missing heartbeat may have arisen simply because the batteries are exhausted rather than due to any malfunction or other anomalous condition). However, in response to determining that battery power is available at block 1750 (e.g., that the missing heartbeat is not attributable to depleted batteries), or alternatively in response to determining at block 1730 that the heartbeat was detected, a test function may be invoked and a further check performed at block 1740 to determine whether the current observed behavior indicates that the smoke detector IoT device passed the test function. In the affirmative, the smoke detector health may be deemed normal at block 1760. Alternatively, in response to determining at block 1740 that the smoke detector IoT device did not pass the test function, an anomalous condition may be detected and reported at block 1770, which may comprise transmitting the observed behavior parameters to customer service (e.g., the results from the heartbeat check, the test function results, an observed carbon monoxide level, etc. Furthermore, at block 1770, an anomaly remediation request and response system may be invoked to enable back and forth messaging with appropriate support partners such that more information can be gathered and the anomalous behavior can be diagnosed and resolved through appropriate troubleshooting procedures.

Figure 18:
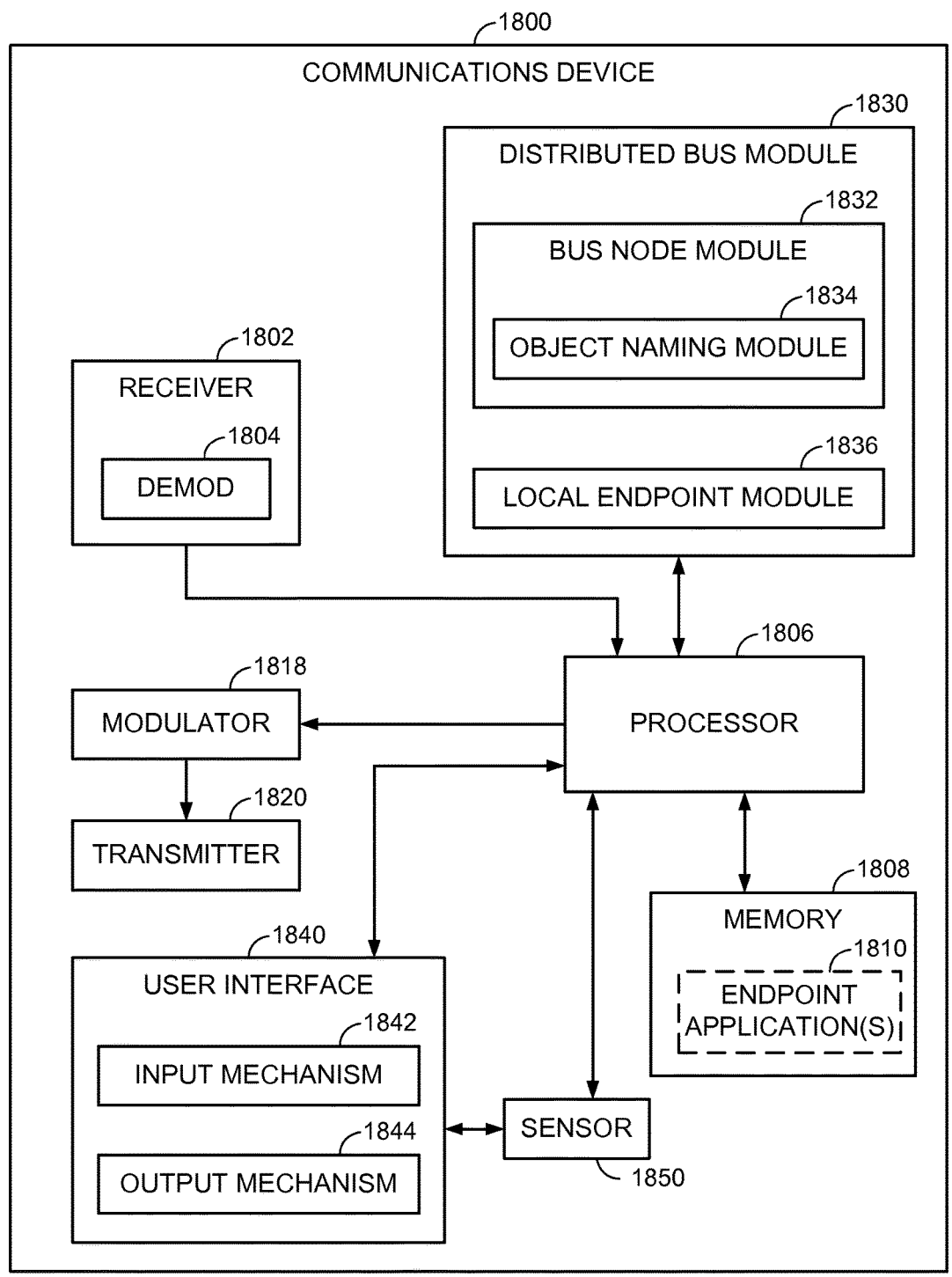
FIG. 18 illustrates an exemplary communications device that may be configured to observe, aggregate, and/or analyze IoT device behavior, according to various aspects.

According to various aspects, FIG. 18 illustrates an exemplary communications device 1800 that may be configured to observe, aggregate, and/or analyze IoT device behavior through communication over a proximity-based distributed bus using discoverable D2D services in accordance with the various aspects and embodiments disclosed herein. In particular, as shown in FIG. 18, the communications device 1800 may comprise a receiver 1802 that may receive a signal from, for instance, a receive antenna (not shown), perform typical actions on the received signal (e.g., filtering, amplifying, downconverting, etc.), and digitize the conditioned signal to obtain samples. The receiver 1202 can comprise a demodulator 1804 that can demodulate received symbols and provide them to a processor 1806 for channel estimation. The processor 1806 can be dedicated to analyzing information received by the receiver 1802 and/or generating information for transmission by a transmitter 1820, control one or more components of the communications device 1800, and/or any suitable combination thereof.

In various embodiments, the communications device 1800 can additionally comprise a memory 1808 operatively coupled to the processor 1806, wherein the memory 1808 can store received data, data to be transmitted, information related to available channels, data associated with analyzed signal and/or interference strength, information related to an assigned channel, power, rate, or the like, and any other suitable information for estimating a channel and communicating via the channel. In various embodiments, the memory 1808 can include one or more local endpoint applications 1810, which may seek to communicate with endpoint applications, services, etc., on the communications device 1800 and/or other communications devices (not shown) through a distributed bus module 1830. The memory 1808 can additionally store protocols and/or algorithms associated with estimating and/or utilizing a channel (e.g., performance based, capacity based, etc.).

Those skilled in the art will appreciate that the memory 1808 and/or other data stores described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1808 in the subject systems and methods may comprise, without being limited to, these and any other suitable types of memory.

In various embodiments, the distributed bus module 1830 associated with the communications device 1800 can further facilitate establishing connections with other devices. The distributed bus module 1830 may further comprise a bus node module 1832 to assist the distributed bus module 1830 with managing communications between multiple devices. In various embodiments, the bus node module 1832 may further include an object naming module 1834 to assist the bus node module 1832 in communicating with endpoint applications associated with other devices. Still further, the distributed bus module 1830 may include an endpoint module 1836 to assist the local endpoint applications 1810 in communicating with other local endpoints and/or endpoint applications accessible on other devices through an established distributed bus. In another aspect, the distributed bus module 1830 may facilitate inter-device and/or intra-device communications over multiple available transports (e.g., Bluetooth, UNIX domain-sockets, TCP/IP, Wi-Fi, etc.). Accordingly, in various embodiments, the distributed bus module 1830 and the endpoint applications 1810 may be used to establish and/or join a proximity-based distributed bus over which the communication device 1800 can communicate with other communication devices in proximity thereto using direct device-to-device (D2D) communication.

Additionally, in various embodiments, the communications device 1800 may include a user interface 1840, which may include one or more input mechanisms 1842 for generating inputs into the communications device 1800, and one or more output mechanisms 1844 for generating information for consumption by the user of the communications device 1800. For example, the input mechanisms 1842 may include a mechanism such as a key or keyboard, a mouse, a touch-screen display, a microphone, etc. Further, for example, the output mechanisms 1844 may include a display, an audio speaker, a haptic feedback mechanism, a Personal Area Network (PAN) transceiver etc. In the illustrated aspects, the output mechanisms 1844 may include an audio speaker operable to render media content in an audio form, a display operable to render media content in an image or video format and/or timed metadata in a textual or visual form, or other suitable output mechanisms. However, in various embodiments, a headless communications device 1800 may not include certain input mechanisms 1842 and/or output mechanisms 1844 because headless devices generally refer to computer systems or device that have been configured to operate without a monitor, keyboard, and/or mouse.

Furthermore, in various embodiments, the communications device 1800 may include one or more sensors 1850 that can obtain various measurements relating to a local environment associated with the communications device 1800. For example, in various embodiments, the sensors 1850 may include an accelerometer, gyroscope, or other suitable sensors that can obtain measurements that relate to inflicted motion at the communications device 1800. In another example, the sensors 1850 may include appropriate hardware, circuitry, or other suitable devices that can obtain measurements relating to internal and/or ambient temperature, power consumption, local radio signals, lighting, and/or other local and/or ambient environmental variables.

Accordingly, in context with the various aspects and embodiments described above that relate to direct and/or indirect behavioral analysis that can be used to automate device health monitoring in a local IoT environment, the communication device 1800 shown in FIG. 18 may correspond to the IoT device 900 shown in FIG. 9, in which case the local endpoint applications 1810 may comprise the on-device health monitoring platform 910 and the various modules and/or other components associated therewith. Additionally (or alternatively), the communication device 1800 may correspond to any one or more of the devices shown in FIG. 10 that are configured or otherwise designated to operate in an observer mode, an aggregator mode, or analyzer mode. For example, in implementations where the communications device 1800 corresponds to a device configured to operate in the observer mode, the various components associated with the communications device 1800 may be used to observe or otherwise monitor behavior associated therewith and communicate the observed behavior to another device configured to operate in the aggregator mode and/or the analyzer mode (e.g., via the distributed bus module 1830). In a similar respect, in implementations where the communications device 1800 corresponds to a device configured to operate in the aggregator mode, the communications device 1800 may receive behavior observations from one or more devices configured to operate in the observer mode and use the distributed bus module 1830 to relay the behavior observations to another device configured to operate in the analyzer mode. Furthermore, where the communications device 1800 has sufficient capabilities to operate in the analyzer mode, the communications device 1800 may receive the aggregated behavior observations from one or more devices configured to operate in the observer mode and/or the aggregator mode via the distributed bus module 1830, whereby the communications device 1800 may correspond to the always-on monitoring device 1110 shown in FIG. 11 and the local endpoint applications 1810 may comprise a behavior vector extraction module and an analysis module used to derive behavior vectors and detect anomalous behavior at other devices in the environment and/or within the environment itself.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. The functions, steps and/or actions of the method claims in accordance with the aspects and embodiments described herein need not be performed in any particular order. Furthermore, although elements may be described above or claimed in the singular, the plural is contemplated unless limitation to the singular is explicitly stated.

What is claimed is:

1. A method for monitoring Internet of Things (IoT) device health, comprising:
    modeling, at an analyzer node in a local IoT network, normal behavior associated with an IoT device in the local IoT network, wherein the modeled normal behavior defines one or more threshold values for one or more local behaviors at the IoT device;
    receiving, at the analyzer node over the local IoT network, behavioral information observed at the IoT device, the behavioral information including actual values for the one or more local behaviors as observed at the IoT device;
    performing, at the analyzer node, a first comparison between the actual values for the one or more local behaviors as observed at the IoT device and the threshold values for the one or more local behaviors as defined in the modeled normal behavior associated with the IoT device;
    determining, at the analyzer node, whether the behavioral information observed at the IoT device is normal or indicative of an anomalous condition requiring remedial action based on the first comparison in combination with a second comparison based on an overall state model defining a current state and a normal state associated with the local IoT network; and
    triggering, by the analyzer node, the remedial action in response to determining that the behavioral information observed at the IoT device is indicative of the anomalous condition based on the first comparison in combination with the second comparison.

2. The method recited in claim 1, wherein analyzing the behavioral information related to the one or more local behaviors observed at the IoT device further comprises:
    extracting one or more behavior vectors from the behavioral information, wherein the behavioral information represents n behavioral features and the one or more behavior vectors map the n behavioral features into an n-dimensional space.

3. The method recited in claim 1, further comprising:
    modeling the local IoT network that includes the IoT device; and
    updating at least the current state associated with the local IoT network based on the behavioral information observed at the IoT device.

4. The method recited in claim 3, wherein modeling the local IoT network comprises:
    aggregating attributes associated with each IoT device in the local IoT network;
    constructing a topology associated with the local IoT network;
    obtaining behavioral models associated with each IoT device in the local IoT network from a manufacturer associated with each IoT device or one or more repositories configured to store the behavioral models; and
    combining the aggregated attributes associated with each IoT device in the local IoT network, the topology associated with the local IoT network, and the behavioral models associated with each IoT device in the local IoT network to model the local IoT network.

5. The method recited in claim 1, further comprising:
    reporting the one or more local behaviors observed at the IoT device to a customer service entity in response to determining that the one or more local behaviors observed at the IoT device are anomalous.

6. The method recited in claim 5, wherein the one or more anomalous behaviors indicate a potential malicious attack against the IoT device or the local IoT network that includes the IoT device.

7. The method recited in claim 5, wherein the one or more anomalous behaviors indicate a potential malfunction or abnormal operating condition at the IoT device.

8. The method recited in claim 1, wherein the IoT device comprises one or more components instrumented to observe the one or more local behaviors.

9. The method recited in claim 8, wherein the IoT device further comprises a transmitter configured to send one or more behavioral features representing the one or more local behaviors observed at the IoT device to one or more of the analyzer node or an aggregator node configured to receive the one or more behavioral features from the IoT device and to relay the one or more behavioral features to the analyzer node.

10. The method recited in claim 1, wherein the local IoT network that includes the IoT device further includes one or more nodes configured to monitor messages that the IoT device transmits over the local IoT network and to observe the behavioral information at the IoT device according to the monitored messages transmitted over the local IoT network.

11. An apparatus for monitoring Internet of Things (IoT) device health, comprising:
    at least one storage device configured to store information modeling normal behavior associated with an IoT device in a local IoT network, wherein the modeled normal behavior defines one or more threshold values for one or more local behaviors at the IoT device;
    a transceiver configured to receive behavioral information observed at the IoT device, the behavioral information including actual values for the one or more local behaviors as observed at the IoT device over the local IoT network; and
    one or more processors configured to:
        perform a first comparison between the actual values for the one or more local behaviors as observed at the IoT device and the threshold values for the one or more local behaviors as defined in the modeled normal behavior associated with the IoT device;
        determine whether the behavioral information observed at the IoT device is normal or indicative an anomalous condition requiring remedial action based on the first comparison in combination with a second comparison based on an overall state model defining a current state and a normal state associated with the local IoT network; and trigger the remedial action in response to the behavioral information observed at the IoT device being indicative of the anomalous condition based on the first comparison in combination with the second comparison.

12. The apparatus recited in claim 11, wherein the one or more processors are further configured to extract one or more behavior vectors from the behavioral information, wherein the behavioral information represents n behavioral features and the one or more behavior vectors map the n behavioral features into an n-dimensional space.

13. The apparatus recited in claim 11, wherein:
the at least one storage device is further configured to store information modeling the local IoT network that includes the IoT device; and
the one or more processors are further configured to update at least the current state associated with the local IoT network based on the behavioral information observed at the IoT device.

14. The apparatus recited in claim 13, wherein the one or more processors are further configured to:
aggregate attributes associated with each IoT device in the local IoT network;
construct a topology associated with the local IoT network;
obtain behavioral models associated with each IoT device in the local IoT network from a manufacturer associated with each IoT device or one or more repositories configured to store the behavioral models; and
combine the aggregated attributes associated with each IoT device in the local IoT network, the topology associated with the local IoT network, and the behavioral models associated with each IoT device in the local IoT network to model the local IoT network.

15. The apparatus recited in claim 11, wherein the one or more processors are further configured to report the one or more local behaviors observed at the IoT device to a customer service entity in response to the one or more local behaviors observed at the IoT device indicating anomalous behavior.

16. The apparatus recited in claim 15, wherein the anomalous behavior comprises one or more of a potential malicious attack against the IoT device or the local IoT network that includes the IoT device or a potential malfunction or abnormal operating condition at the IoT device.

17. The apparatus recited in claim 11, further comprising an on-device health monitoring platform, wherein the on-device health monitoring platform comprises at least:
a behavior vector extraction module configured to extract one or more behavior vectors from the behavioral information related to the one or more local behaviors observed at the IoT device; and
an analysis module configured to compare the one or more behavior vectors extracted from the behavioral information to the modeled normal behavior associated with the IoT device to determine whether the one or more local behaviors observed at the IoT device indicate normal behavior or anomalous behavior.

18. The apparatus recited in claim 17, wherein the behavioral information is received from one or more of the IoT device or an aggregator node configured to receive the behavioral information from the IoT device and to relay the behavioral information to the apparatus.

19. The apparatus recited in claim 17, wherein the on-device health monitoring platform further comprises:
one or more components instrumented to observe local behavior at the apparatus, wherein the information modeling the normal behavior associated with the IoT device is based at least in part on the local behavior observed at the apparatus.

20. The apparatus recited in claim 11, wherein the behavioral information is received from one or more network traffic monitoring nodes configured to monitor messages that the IoT device transmits over the local IoT network and to communicate the behavioral information to the apparatus according to the monitored messages that the IoT device transmits over the local IoT network.

21. An apparatus for monitoring Internet of Things (IoT) device health, comprising:
means for modeling normal behavior associated with an IoT device in a local IoT network, wherein the modeled normal behavior defines one or more threshold values for one or more local behaviors at the IoT device;
means for receiving, over the local IoT network, behavioral information observed at the IoT device, the behavioral information including actual values for the one or more local behaviors as observed at the IoT device;
means for performing a first comparison between the actual values for the one or more local behaviors as observed at the IoT device and the threshold values for the one or more local behaviors as defined in the modeled normal behavior associated with the IoT device;
means for determining whether the behavioral information observed at the IoT device is normal or indicative of an anomalous condition requiring remedial action based on the first comparison in combination with a second comparison based on an overall state model defining a current state and a normal state associated with the local IoT network; and
means for triggering the remedial action in response to the behavioral information observed at the IoT device being indicative of the anomalous condition based on the first comparison in combination with the second comparison.

22. The apparatus recited in claim 21, further comprising means for extracting one or more behavior vectors from the behavioral information, wherein the behavioral information represents n behavioral features and the one or more behavior vectors map the n behavioral features into an n-dimensional space.

23. The apparatus recited in claim 21, further comprising:
means for modeling the local IoT network that includes the IoT device; and
means for updating at least the current state associated with the local IoT network based on the behavioral information observed at the IoT device.

24. The apparatus recited in claim 23, further comprising:
means for aggregating attributes associated with each IoT device in the local IoT network;
means for constructing a topology associated with the local IoT network;
means for obtaining behavioral models associated with each IoT device in the local IoT network from a manufacturer associated with each IoT device or one or more repositories configured to store the behavioral models; and
means for combining the aggregated attributes associated with each IoT device in the local IoT network, the topology associated with the local IoT network, and the behavioral models associated with each IoT device in the local IoT network to model the local IoT network.

25. The apparatus recited in claim 21, further comprising means for reporting the one or more local behaviors observed at the IoT device to a customer service entity in response to the one or more local behaviors observed at the IoT device indicating anomalous behavior.

26. The apparatus recited in claim 25, wherein the anomalous behavior comprises a potential malicious attack against the IoT device or the local IoT network that includes the IoT device.

27. The apparatus recited in claim 25, wherein the anomalous behavior comprises a potential malfunction or abnormal operating condition at the IoT device.

28. The apparatus recited in claim 21, wherein the behavioral information is received from one or more of the IoT device or an aggregator node configured to receive the behavioral information from the IoT device and to relay the behavioral information to the apparatus.

29. The apparatus recited in claim 21, wherein the behavioral information is received from one or more network traffic monitoring nodes configured to monitor messages that the IoT device transmits over the local IoT network and to communicate the behavioral information to the apparatus according to the monitored messages that the IoT device transmits over the local IoT network.

30. A non-transitory computer-readable storage medium having computer-executable instructions recorded thereon, wherein executing the computer-executable instructions on one or more processors causes the one or more processors to:

model normal behavior associated with an Internet of Things (IoT) device in a local IoT network, wherein the modeled normal behavior defines one or more threshold values for one or more local behaviors at the IoT device;

receive, over the local IoT network, behavioral information observed at the IoT device, the behavioral information including actual values for the one or more local behaviors as observed at the IoT device;

perform a first comparison between the actual values for the one or more local behaviors as observed at the IoT device and the threshold values for the one or more local behaviors as defined in the modeled normal behavior associated with the IoT device;

determine whether the behavioral information observed at the IoT device is normal or indicative an anomalous condition requiring remedial action based on the first comparison in combination with a second comparison based on an overall state model defining a current state and a normal state associated with the local IoT network; and trigger the remedial action in response to the behavioral information observed at the IoT device being indicative of the anomalous condition based on the first comparison in combination with the second comparison.

* * * * *